(12) United States Patent
Sato

(10) Patent No.: US 11,545,682 B2
(45) Date of Patent: Jan. 3, 2023

(54) FUEL CELL SYSTEM AND REFRIGERANT FLOW RATE ESTIMATION METHOD FOR THE SAME

(71) Applicant: NISSAN MOTOR CO., LTD., Yokohama (JP)

(72) Inventor: Masashi Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 115 days.

(21) Appl. No.: 16/630,926

(22) PCT Filed: Aug. 14, 2017

(86) PCT No.: PCT/JP2017/029318
§ 371 (c)(1),
(2) Date: Jan. 14, 2020

(87) PCT Pub. No.: WO2019/035171
PCT Pub. Date: Feb. 21, 2019

(65) Prior Publication Data
US 2020/0235412 A1 Jul. 23, 2020

(51) Int. Cl.
*H01M 8/0438* (2016.01)
*H01M 8/0432* (2016.01)
(Continued)

(52) U.S. Cl.
CPC ..... *H01M 8/04417* (2013.01); *H01M 8/0494* (2013.01); *H01M 8/04358* (2013.01);
(Continued)

(58) Field of Classification Search
CPC ......... H01M 8/04417; H01M 8/04552; H01M 8/04582; H01M 8/04723; H01M 8/04753; H01M 8/0494
See application file for complete search history.

(56) References Cited

U.S. PATENT DOCUMENTS 7,862,949 B2 * 1/2011 Alp .................. G01K 13/10
429/442
8,110,313 B2 2/2012 Chikugo et al.
(Continued)

FOREIGN PATENT DOCUMENTS

JP 63-143756 A 6/1988
JP 2006-294498 A 10/2006
(Continued)

OTHER PUBLICATIONS

Urone and Hinrichs, OpenStax College Physics (Year: 2012).*

*Primary Examiner* — Milton I Cano
*Assistant Examiner* — Mary G Henshaw
(74) *Attorney, Agent, or Firm* — Foley & Lardner LLP

(57) ABSTRACT

A fuel cell system including: a fuel cell group; a refrigerant distribution passage; a pre-distribution refrigerant flow rate acquiring unit configured to acquire a first outlet temperature flow rate; a first outlet temperature detecting unit that is configured to detect a first outlet temperature; a voltage acquiring unit configured to acquire at least a first voltage that is a voltage of the first fuel cell; a current acquiring unit configured to acquire at least a first current; and a controller that calculates a first individual supply flow rate of the first fuel cell on the basis of the first voltage, the first current, and the first outlet temperature, and calculates a second individual supply flow rate of at least one second fuel cell other than the first fuel cell on the basis of the first individual supply flow rate and the pre-distribution refrigerant flow rate.

3 Claims, 16 Drawing Sheets

(51) Int. Cl.
*H01M 8/04537* (2016.01)
*H01M 8/04701* (2016.01)
*H01M 8/04746* (2016.01)
*H01M 8/04858* (2016.01)

(52) U.S. Cl.
CPC ... *H01M 8/04552* (2013.01); *H01M 8/04582* (2013.01); *H01M 8/04723* (2013.01); *H01M 8/04753* (2013.01); *H01M 8/04768* (2013.01)

(56) References Cited

U.S. PATENT DOCUMENTS

| | | |
|---|---|---|
| 2006/0172176 A1 | 8/2006 | Macbain et al. |
| 2007/0065695 A1 | 3/2007 | Maier et al. |
| 2007/0231643 A1 | 10/2007 | Yamaga et al. |
| 2009/0035613 A1 | 2/2009 | Chikugo et al. |
| 2013/0323539 A1* | 12/2013 | Furusawa ......... H01M 8/04228 429/429 |

FOREIGN PATENT DOCUMENTS

| | | | |
|---|---|---|---|
| JP | 2007-188667 A | 7/2007 | |
| JP | 2007-220527 A | 8/2007 | |
| WO | WO-2010123146 A1 * | 10/2010 | ........ H01M 8/04291 |
| WO | WO 2013/083873 A1 | 6/2013 | |

* cited by examiner

FUEL CELL SYSTEM AND REFRIGERANT FLOW RATE ESTIMATION METHOD FOR THE SAME

TECHNICAL FIELD

The present invention relates to a fuel cell system that cools a fuel cell by supplying a refrigerant, such as air, to the fuel cell and estimates a refrigerant flow rate at a refrigerant outlet of the fuel cell, and to estimation method for estimating a flow rate of a refrigerant supplied in the fuel cell system.

BACKGROUND ART

There is known a fuel cell system that supplies a refrigerant, such as cooling water or air, to a fuel cell to control the temperature of the fuel cell to a predetermined temperature. JP2007-188667 A has disclosed an example of such a fuel cell system, particularly, a fuel cell system provided with a plurality of fuel cell groups.

The fuel cell system disclosed in JP2007-188667 A includes a refrigerant supply system in which a plurality of fuel cell groups is arranged in parallel, and the refrigerant supply system includes a refrigerant supply passage for supplying a refrigerant to the fuel cell groups, an inlet temperature sensor provided on the refrigerant supply passage, refrigerant distribution passages that branch from the refrigerant supply passage to individually distribute the refrigerant from the refrigerant supply passage to the fuel cell groups, a voltage sensor that measures respective voltages of the cell groups, a refrigerant discharge passage where refrigerants discharged from the fuel cell groups are merged, and an outlet temperature sensor that detects a temperature of the merged discharged refrigerant.

Then, the fuel cell system estimates respective calorific values of cells from a measured voltage value, etc. of each cell group, and estimates a temperature difference (a difference between a pre-supply refrigerant temperature and a discharged refrigerant temperature) of each cell group on the basis of a detected inlet temperature value from the inlet temperature sensor, a detected outlet temperature value from the outlet temperature sensor, and the estimates of the calorific values.

SUMMARY OF INVENTION

However, in the fuel cell system, a uniform flow rate of refrigerant is not necessarily distributed from the refrigerant supply passage to each refrigerant distribution passage. The flow rate of refrigerant distributed and supplied to each refrigerant distribution passage varies, for example, according to differences in various conditions, such as a pressure and a temperature in a refrigerant passage in each fuel cell group.

Therefore, if there is such variation in the flow rate of supplied refrigerant, the degree of cooling differs among the fuel cell groups, and there is variation in real calorific value.

Meanwhile, in the fuel cell system, the detected inlet temperature value and the detected outlet temperature value that are used for estimation of a calorific value of each fuel cell group only include temperature information before the distribution of the supplied refrigerant and temperature information after the discharged refrigerants are merged, respectively. As a result, this estimation of the calorific value does not take into consideration the variation in real calorific value among the fuel cell groups, and therefore the estimation accuracy of an estimate of the calorific value and an estimate of a temperature difference of each cell group based on this may be insufficient.

Therefore, an object of the present invention is to allow a fuel cell system that cools a plurality of fuel cells by distributing a refrigerant to the fuel cells to estimate a flow rate of refrigerant supplied to each fuel cell with higher accuracy.

An aspect of the present invention provides a fuel cell system comprising a fuel cell group including a plurality of fuel cells, a refrigerant distribution passage through which a refrigerant is individually distributed to the fuel cells composing the fuel cell group, a pre-distribution refrigerant flow rate acquiring unit configured to acquire a pre-distribution refrigerant flow rate that is a flow rate of the refrigerant before distribution, a first outlet temperature detecting unit that is provided at a refrigerant outlet of at least one first fuel cell in the fuel cell group in the refrigerant distribution passage, and is configured to detect a first outlet temperature that is a refrigerant outlet temperature of the first fuel cell, a voltage acquiring unit configured to acquire at least a first voltage that is a voltage of the first fuel cell, a current acquiring unit configured to acquire at least a first current that is a current of the first fuel cell, and a controller, wherein the controller calculates a first individual supply flow rate that is a flow rate of the refrigerant individually supplied to the first fuel cell on a basis of the first voltage, the first current, and the first outlet temperature, and a second individual supply flow rate that is a flow rate of the refrigerant individually supplied to at least one second fuel cell other than the first fuel cell on a basis of the first individual supply flow rate and the pre-distribution refrigerant flow rate.

DESCRIPTION OF EMBODIMENTS

Embodiments of the present invention are described below with reference to accompanying drawings.

First Embodiment

Figure 1:
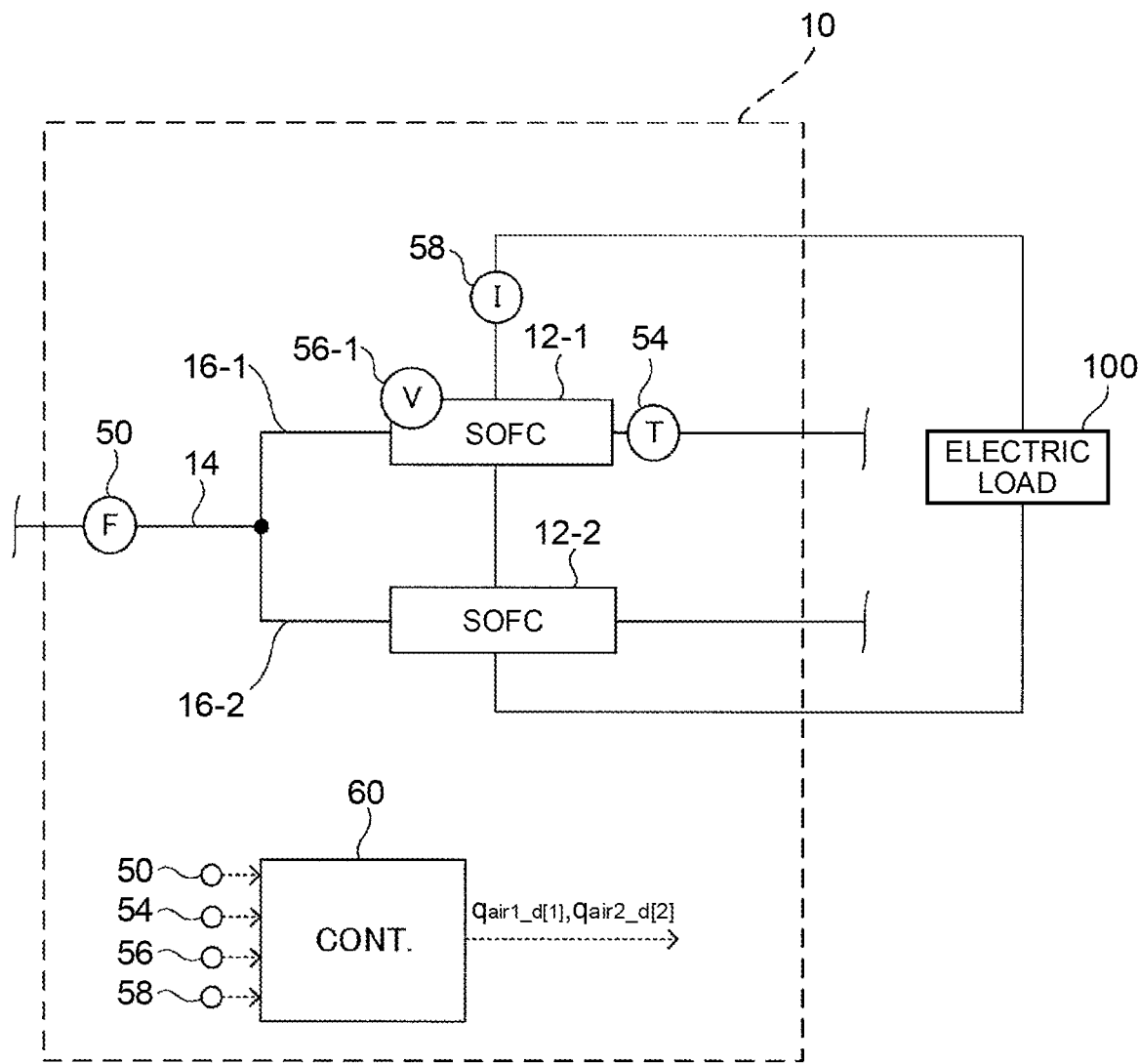
FIG. 1 is a diagram illustrating a configuration of a fuel cell system according to a first embodiment.

FIG. 1 is a diagram illustrating a configuration of a fuel cell system according to a first embodiment.

As shown in the drawing, a fuel cell system 10 includes a fuel cell group 12 including two solid oxide fuel cell (SOFC) stacks 12-1 and 12-2 that are a plurality of fuel cells, an air supply passage 14 that is a refrigerant supply passage through which air as a refrigerant is supplied to the fuel cell group 12, and an air distribution passage 16 as a refrigerant distribution passage through which the air is individually distributed to the SOFC stacks 12-1 and 12-2 composing the fuel cell group 12. It is to be noted that in the present embodiment, the "SOFC stack 12-1" corresponds to a "first fuel cell", and the "SOFC stack 12-2" corresponds to a "second fuel cell". Therefore, hereinafter, the "SOFC stack 12-1" and the "SOFC stack 12-2" are also referred to as the "first SOFC stack 12-1" and the "second SOFC stack 12-2", respectively.

Then, the first SOFC stack 12-1 and the second SOFC stack 12-2 are arranged in parallel with an electric load 100 including a traction motor, various auxiliary machines, a predetermined battery, etc. that are not shown.

The first SOFC stack 12-1 and the second SOFC stack 12-2 are both a fuel cell stack in which a plurality of SOFC cells each obtained by holding an electrolyte layer made of solid oxide, such as ceramic, between an anode (a fuel electrode) and a cathode (an air electrode) is stacked. Then, the first SOFC stack 12-1 and the second SOFC stack 12-2 cause fuel gas (hydrogen) supplied to the fuel electrode from a fuel supply system (not shown) to react with oxidizing gas (air) supplied to the air electrode from an air supply system (not shown) or through the air distribution passage 16, thereby generating electric power.

Furthermore, the fuel cell group 10 includes a pre-distribution air flow rate sensor 50 and a first outlet temperature sensor 54. The pre-distribution air flow rate sensor 50 detects a pre-distribution air flow rate $q_{air}$ that is a flow rate of air in the air supply passage 14, i.e., a flow rate of air before it is distributed to all the SOFC stacks 12-1 and 12-2. The first outlet temperature sensor 54 is provided at an air outlet of the SOFC stack 12-1 in the air distribution passage 16, and detects a first outlet temperature $T_{o1[1]}$ that is an outlet temperature of the SOFC stack 12-1.

The air supply passage 14 is a passage for supplying air fed from an air blower or the like (not shown) to the fuel cell group 12.

The air distribution passage 16 includes a first distribution path 16-1 through which air from the air supply passage 14 is distributed to the first SOFC stack 12-1 and a second distribution path 16-2 through which the air from the air supply passage 14 is distributed to the second SOFC stack 12-2. In this configuration, the air supplied to the first SOFC stack 12-1 and the second SOFC stack 12-2 through the first distribution path 16-1 and the second distribution path 16-2 cools the first SOFC stack 12-1 and the second SOFC stack 12-2, and then is discharged into, for example, a cooling device (not shown) or a discharged gas system (not shown).

Moreover, the fuel cell system 10 includes a voltage sensor 56 and a current sensor 58. The voltage sensor 56 detects a first voltage $V_{1[1]}$ that is a voltage of the first SOFC stack 12-1. The current sensor 58 detects a current I as a first current that is a current of the first SOFC stack 12-1.

It is to be noted that in the present embodiment, the SOFC stacks 12-1 and 12-2 are arranged in parallel with the electric load 100; therefore, the "first current" of the first SOFC stack 12-1 and a "second current" of the second SOFC stack 12-2 are both detected as a "current I". The same applies to first to third modification examples and second to fifth embodiments to be described later.

Furthermore, the fuel cell system 10 includes a controller 60. The controller 60 calculates a first calorific value $Q_{gen1[1]}$ that is a calorific value of the first SOFC stack 12-1 on the basis of the first voltage $V_{1[1]}$ received from the voltage sensor 56 and the current I received from the current sensor 58.

Furthermore, the controller 60 calculates a first individual supply flow rate $q_{air1\_d[1]}$ that is a flow rate of air individually supplied to the first SOFC stack 12-1 through the first distribution path 16-1 on the basis of the pre-distribution air flow rate $q_{air}$ received from the pre-distribution air flow rate sensor 50, the first outlet temperature $T_{o1[1]}$ received from the first outlet temperature sensor 54, and the calculated first calorific value $Q_{gen1[1]}$. Moreover, the controller 60 calculates a second individual supply flow rate $q_{air2\_d[2]}$ that is a flow rate of air individually supplied to the second SOFC stack 12-2 on the basis of the calculated first individual supply flow rate $q_{air1\_d[1]}$.

It is to be noted that the controller 60 is configured of a computer, particularly, a microcomputer that includes a central processing unit (CPU), a read-only memory (ROM), a random access memory (RAM), and an input/output (I/O) interface. Then, the controller 60 is programmed, at least, to be able to execute processing required to perform respective processes associated with the present embodiment or any of later-described modification examples 1 to 3, or any of the second to fifth embodiments.

It is to be noted that the controller 60 may be configured as one device, or may be configured of multiple devices so that the multiple devices share and process controls of the present embodiment.

Below are described details of calculation of the first individual supply flow rate $q_{air1\_d[1]}$ and the second individual supply flow rate $q_{air2\_d[1]}$.

Figure 2:
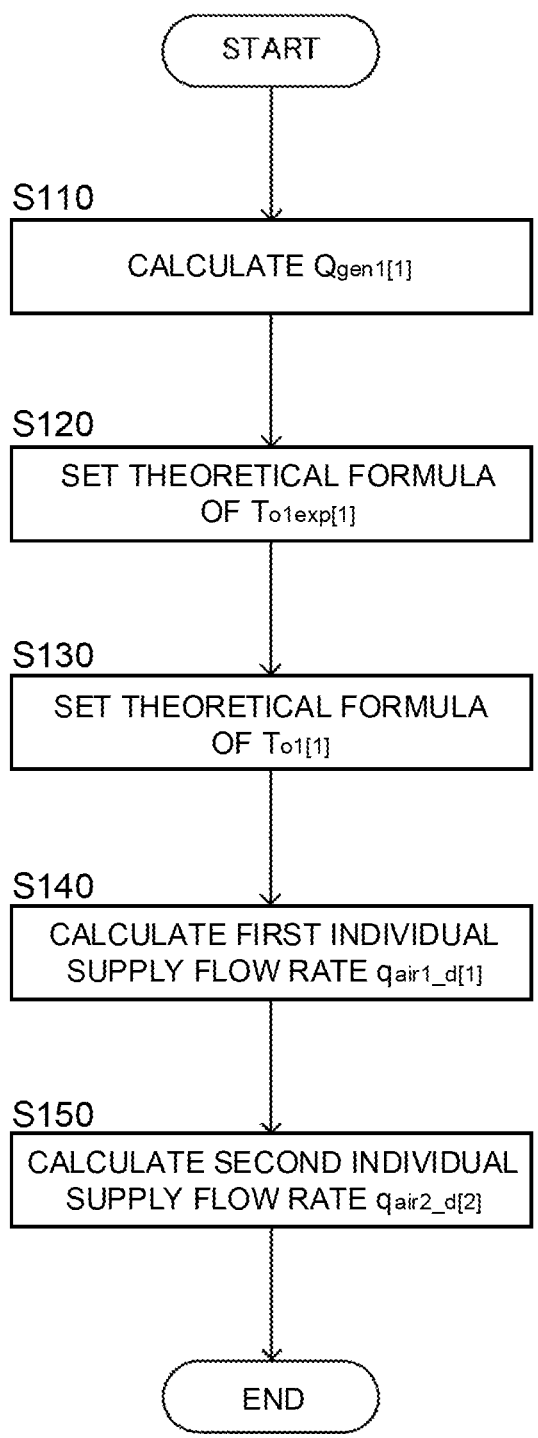
FIG. 2 is a flowchart illustrating the flow of calculation of a first individual supply flow rate and a second individual supply flow rate in the first embodiment.

FIG. 2 is a flowchart illustrating the flow of the calculation of the first individual supply flow rate $q_{air1\_d[1]}$ and the second individual supply flow rate $q_{air2\_d[2]}$.

At Step S110, using the following Expression (1), the controller 60 calculates a first calorific value $Q_{gen1[1]}$ due to power generation of the first SOFC stack 12-1 on the basis of a first voltage $V_{1[1]}$ and a current I.

[Math. 1]

$$Q_{gen1[1]} = I(E_0 - V_{1[1]}) \qquad (1)$$

It is to be noted that "$E_0$" in the expression denotes a theoretical electromotive force of the first SOFC stack 12-1.

At Step S120, the controller 60 sets a theoretical formula of an assumed first outlet temperature value $T_{O1exp[1]}$ shown in the following Expression (2).

[Math. 2]

$$T_{O1exp[1]} = T_{in} + \frac{Q_{gen1[1]}}{\frac{q_{air}}{2} \cdot c_{air}} \quad (2)$$

It is to be noted that "$T_{in}$" in Expression (2) denotes a temperature of air in the air supply passage 14 (hereinafter, also referred to as a "pre-supply air temperature $T_{in}$"); "$q_{air}/2$" denotes a value obtained by dividing a pre-distribution air flow rate $q_{air}$ detected by the pre-distribution air flow rate sensor 50 by 2 that is the number of SOFCs disposed in the fuel cell group 12 in the present embodiment; and "$c_{air}$" denotes a specific heat capacity of air (hereinafter, referred to simply as an "air specific heat $c_{air}$").

It is to be noted that a predetermined fixed value determined in an experiment or the like is used as the air specific heat $c_{air}$. Furthermore, hereinafter, "$q_{air}/2$", a value obtained by dividing the pre-distribution air flow rate $q_{air}$ by the number of the disposed SOFC stacks 12, is also referred to as an "ideal distribution air flow rate $q_{air}/2$".

Furthermore, the assumed first outlet temperature value $T_{O1exp[1]}$ is a value of an outlet air temperature expected to be detected by the first SOFC stack 12-1 if a uniform flow rate of air is distributed from the air supply passage 14 to the first distribution path 16-1 and the second distribution path 16-2 (i.e., if there is no variation in the flow rate of air at the time of distribution).

Moreover, a denominator of a second term on the right side in Expression (2), i.e., a value obtained by multiplying the ideal distribution air flow rate $q_{air}/2$ and the air specific heat $c_{air}$ corresponds to a heat capacity per unit time of air supplied to the first SOFC stack 12-1 (hereinafter, also referred to simply as a "supply air heat capacity"). Therefore, the second term on the right side, where the first calorific value $Q_{gen1[1]}$ of the first SOFC stack 12-1 is divided by the supply air heat capacity, corresponds to a real temperature rise of the air due to heat generation of the first SOFC stack 12-1.

Therefore, the second term on the right side is a value that the real temperature rise of the air due to heat generation of the first SOFC stack 12-1 based on the ideal distribution air flow rate $q_{air}/2$ is added to the pre-supply air temperature $T_{in}$. That is, as shown in Expression (2), the second term on the right side equals to the assumed first outlet temperature value $T_{O1exp[1]}$ on the left side.

Next, at Step S130, the controller 60 sets a theoretical formula of a first outlet temperature $T_{o1[1]}$ shown in the following Expression (3) on the basis of the first calorific value $Q_{gen1[1]}$ of the first SOFC stack 12-1 obtained at Step S110.

[Math. 3]

$$T_{O1[1]} = T_{in} + \frac{Q_{gen1[1]}}{q_{air1\_d[1]} \cdot c_{air}} \quad (3)$$

Then, at Step S140, the controller 60 calculates a first individual supply flow rate $q_{air1\_d[1]}$ on the basis of Expressions (2) and (3). Specifically, the first individual supply flow rate $q_{air1\_d[1]}$ is calculated as shown in the following Expression (4).

[Math. 4]

$$q_{air1\_d[1]} = \frac{\frac{q_{air}}{2} \cdot Q_{gen1[1]}}{Q_{gen1[1]} + \frac{q_{air}}{2} \cdot c_{air}(T_{O1[1]} - T_{O1exp[1]})} \quad (4)$$

It is to be noted that in the above Expression (4), the term of the pre-supply air temperature $T_{in}$ included in Expressions (2) and (3) is eliminated. Therefore, in the present embodiment, the controller 60 can calculate the first individual supply flow rate $q_{air1\_d[1]}$ on the basis of the pre-distribution air flow rate $q_{air}$ detected by the pre-distribution air flow rate sensor 50, the first outlet temperature $T_{o1[1]}$ detected by the first outlet temperature sensor 54, and the first calorific value $Q_{gen1[1]}$ calculated at Step S110.

Then, at Step S150, the controller 60 calculates a second individual supply flow rate $q_{air2\_d[2]}$, which is a flow rate of air supplied to the second SOFC stack 12-2, from the obtained first individual supply flow rate $q_{air1\_d[1]}$. Specifically, as shown in the following Expression (5), the second individual supply flow rate $q_{air2\_d[2]}$ is calculated by subtracting the first individual supply flow rate $q_{air1\_d[1]}$ from the pre-distribution air flow rate $q_{air}$ (=2q).

[Math. 5]

$$q_{air2\_d[2]} = q_{air} - q_{air1\_d[1]} \quad (5)$$

Therefore, according to the present embodiment, it is possible to find the first individual supply flow rate $q_{air1\_d[1]}$ of the first SOFC stack 12-1 and the second individual supply flow rate $q_{air2\_d[2]}$ of the second SOFC stack 12-2 that take into consideration the variation in the flow rate of air distributed from the air supply passage 14 to the first distribution path 16-1 and the second distribution path 16-2.

The fuel cell system 10 according to the present embodiment described above achieves the following functions and effects.

The fuel cell system 10 according to the present embodiment includes: the fuel cell group 12 including the first SOFC stack 12-1 and the second SOFC stack 12-2 that are a plurality of fuel cells; the air distribution passage 16 as a refrigerant distribution passage through which air is individually distributed to the first SOFC stack 12-1 and the second SOFC stack 12-2 that compose the fuel cell group 12; the pre-distribution air flow rate sensor 50 as a pre-distribution refrigerant flow rate acquiring unit that acquires, as a pre-distribution refrigerant flow rate, a pre-distribution air flow rate $q_{air}$ that is a flow rate of air before distribution; the first outlet temperature sensor 54 as a first outlet temperature detecting unit that is provided at a refrigerant outlet of the first SOFC stack 12-1 as a first fuel cell, which is one of the fuel cell group 12, in the first distribution path 16-1 of the air distribution passage 16 and detects a first outlet temperature (a first outlet temperature $T_{o1[1]}$) that is an air outlet temperature of the first SOFC stack 12-1; the voltage sensor 56 as a voltage acquiring unit that acquires a first voltage $V_{1[1]}$ that is a voltage of the first SOFC stack 12-1; the current sensor 58 as a current acquiring unit that acquires a current I (a first current) that is a current of the first SOFC stack 12-1; and the controller 60.

Then, the controller 60 calculates a first individual supply flow rate $q_{air1\_d[1]}$ that is a flow rate of refrigerant individually supplied to the first SOFC stack 12-1 on the basis of the first voltage $V_{1[1]}$, the current I, and the first outlet temperature $T_{o1[1]}$ (Steps S110 to S140 in FIG. 2), and calculates a second individual supply flow rate $q_{air2\_d[2]}$ that is a flow rate of refrigerant individually supplied to the one second SOFC stack 12-2 other than the first SOFC stack 12-1 on the basis of the first individual supply flow rate $q_{air1\_d[1]}$ and the pre-distribution air flow rate $q_{air}$ (Step S150 in FIG. 2).

That is, the present embodiment provides a refrigerant flow rate estimation method for estimating a flow rate of air to be supplied in the fuel cell system 10 that individually distributes and supplies air as a refrigerant to the first SOFC stack 12-1 and the second SOFC stack 12-2 that are a plurality of fuel cells composing the fuel cell group 12. Then, in this refrigerant flow rate estimation method, a first individual supply flow rate $q_{air1\_d[1]}$ that is a flow rate of refrigerant individually supplied to the first SOFC stack 12-1 is calculated on the basis of a pre-distribution air flow rate $q_{air}$ that is a flow rate of refrigerant before distribution, a first outlet temperature $T_{o1[1]}$ detected at the air outlet of the first SOFC stack 12-1 as at least one first fuel cell of the fuel cell group 12, a first voltage $V_{1[1]}$ that is a voltage of the first SOFC stack 12-1, and a current I as a first current that is a current of the first SOFC stack 12-1 (Steps S110 to S140 in FIG. 2). Then, a second individual supply flow rate $q_{air2\_d[2]}$ that is a flow rate of refrigerant individually supplied to the second SOFC stack 12-2 other than the first SOFC stack 12-1 is calculated on the basis of the first individual supply flow rate $q_{air1\_d[1]}$ and the pre-distribution air flow rate $q_{air}$ (Step S150 in FIG. 2).

Accordingly, in a case where air as a refrigerant is distributed to a plurality of disposed SOFCs, it is possible to find a first individual supply flow rate $q_{air1\_d[1]}$ of the first SOFC stack 12-1 whose outlet temperature (first outlet temperature $T_{o1[1]}$) is detected by the first outlet temperature sensor 54 and also estimate a flow rate of air supplied to the second SOFC stack 12-2 on the basis of this first individual supply flow rate $q_{air1\_d[1]}$ and a pre-distribution air flow rate $q_{air}$.

Therefore, even if there is variation in the flow rate of supplied air between the first SOFC stack 12-1 and the second SOFC stack 12-2, the accurate first individual supply flow rate $q_{air1\_d[1]}$ is found in the first SOFC stack 12-1 whose outlet temperature is detected, and thus the flow rate of air supplied to the second SOFC stack 12-2 in which the variation in the flow rate of supplied air is reflected can be estimated by referring to this first individual supply flow rate $q_{air1\_d[1]}$ and the pre-distribution air flow rate $q_{air}$. That is, it is possible to estimate individual flow rates of air supplied to the first SOFC stack 12-1 and the second SOFC stack 12-2 with higher accuracy.

Consequently, temperature control, power generation control, etc. using the flow rates of air supplied to the first SOFC stack 12-1 and the second SOFC stack 12-2 can be also performed with higher accuracy.

In the present embodiment, particularly, the controller 60 calculates the second individual supply flow rate $q_{air2\_d[2]}$ of the second SOFC stack 12-2 from the first individual supply flow rate $q_{air1\_d[1]}$ of the first SOFC stack 12-1 provided with the first outlet temperature sensor 54-1 at its air outlet. Therefore, it is possible to find the second individual supply flow rate $q_{air2\_d[2]}$ without installing a temperature sensor or a flow rate detection sensor at an air outlet of the second SOFC stack 12-2. Accordingly, as compared with an existing fuel cell system in which a temperature sensor is installed at an air outlet of each fuel cell composing the fuel cell group 12, it is possible to reduce the number of temperature sensors installed, and is possible to reduce the cost of manufacturing the system and the maintenance cost of the temperature sensors.

First Modification Example

Subsequently, the first modification example of the first embodiment is described. It is to be noted that a component similar to that of the first embodiment is assigned the same reference numeral, and its description is omitted. Furthermore, in the present modification example, particularly, there is described estimation of a first individual supply flow rate and a second individual supply flow rate in the fuel cell system 10 in which the fuel cell group 12 is composed of n (n is any positive integer) SOFC stacks. It is to be noted that the above-described first embodiment corresponds to a case of n=2 in the present modification example.

Figure 3:
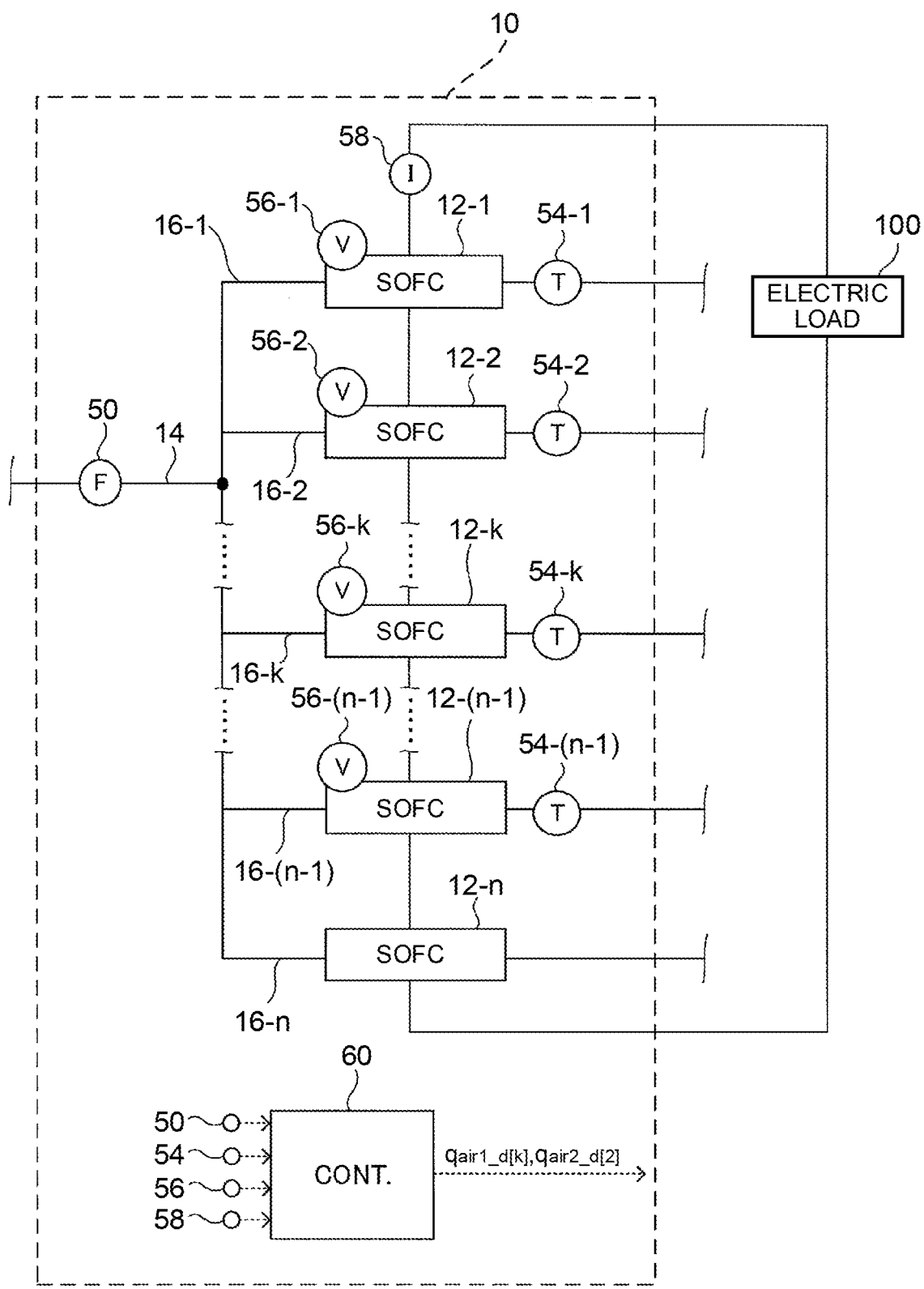
FIG. 3 is a diagram illustrating a configuration of a fuel cell system according to a first modification example.

FIG. 3 is a diagram illustrating a configuration of the fuel cell system 10 according to the first modification example.

As shown in the drawing, in the first modification example, the fuel cell group 12 is composed of n SOFC stacks 12-1, 12-2, . . . , 12-(n−1), and 12-n. Then, the air distribution passage 16 through which air from the air supply passage 14 is distributed to these SOFCs is composed of n passages that are first to nth distribution paths 16-1 to 16-n corresponding to the n SOFCs.

Then, the SOFC stacks 12-1, 12-2, . . . , and 12-(n−1) are provided with voltage sensors 56-1, 56-2, . . . , and 56-(n−1) corresponding to the voltage sensor 56 in the first embodiment, respectively. Furthermore, first outlet temperature sensors 54-1, 54-2, . . . , and 54-(n−1) corresponding to the first outlet temperature sensor 54 in the first embodiment are provided at air outlets of the SOFC stacks 12-1, 12-2, . . . , and 12-(n−1), i.e., the SOFC stacks other than the SOFC stack 12-n, respectively.

Therefore, in the present modification example, the SOFC stacks 12-1, 12-2, . . . , and 12-(n−1) correspond to the "first SOFC stack 12-1" in the first embodiment. Furthermore, the SOFC stack 12-n corresponds to the "second SOFC stack 12-2" in the first embodiment.

It is to be noted that in the present modification example, for the sake of simplicity of description, description about the n−1 first SOFC stacks 12-1, 12-2, . . . , and 12-(n−1) and their peripheral structure is condensed by using an integer k in a range of 1≤k≤n−1 as needed. However, this description holds true for any integer k that meets 1≤k≤n−1.

That is, in the present modification example, the "first SOFC stack 12-1" or the like in the first embodiment is changed into the "first SOFC stack 12-k", and the "second SOFC stack 12-2" or the like in the first embodiment is changed into the "second SOFC stack 12-n". In accordance with this, respective reference numerals of the parameters described in the first embodiment are replaced as follows.

"first outlet temperature $T_{o1[1]}$"⇒"first outlet temperature $T_{o1[k]}$"

"first voltage $V_{1[1]}$"⇒"first voltage $V_{1[k]}$"

"first calorific value $Q_{gen1[1]}$"⇒"first calorific value $Q_{gen1[k]}$"

"assumed first outlet temperature value $T_{O1exp[1]}$"⇒"assumed first outlet temperature value $T_{O1exp[k]}$"

"first individual supply flow rate $q_{air1\_d[1]}$"⇒"first individual supply flow rate $q_{air1\_d[k]}$"

"second individual supply flow rate $q_{air2\_d[2]}$"⇒"second individual supply flow rate $q_{air2\_d[n]}$"

Below are described details of calculation of a first individual supply flow rate $q_{air1\_d[k]}$ and a second individual supply flow rate $q_{air2\_d[n]}$ in the present modification example.

Figure 4:
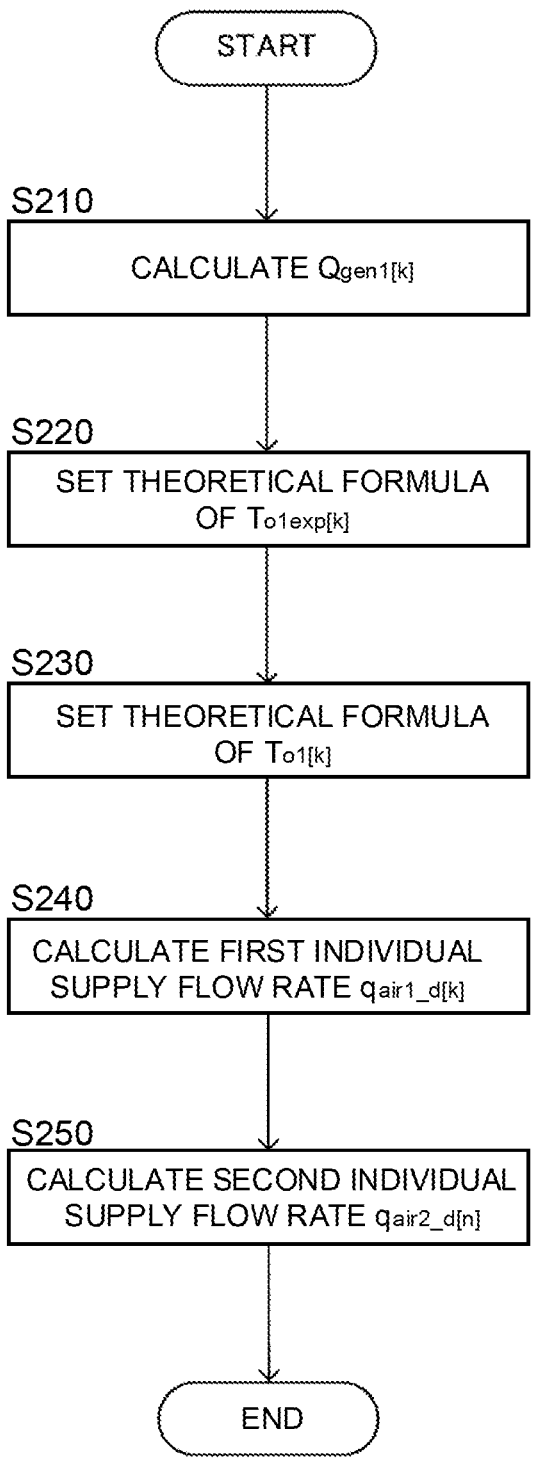
FIG. 4 is a flowchart illustrating the flow of calculation of a first individual supply flow rate and a second individual supply flow rate in the first modification example.

FIG. 4 is a flowchart illustrating the flow of the calculation of the first individual supply flow rate $q_{air1\_d[k]}$ and the second individual supply flow rate $q_{air2\_d[n]}$ in the present modification example.

At Step S210, using the following Expression (6), the controller 60 calculates a first calorific value $Q_{gen1[k]}$ due to power generation of the first SOFC stack 12-$k$ on the basis of a first voltage $V_{1[k]}$ and a current I.

[Math. 6]

$$Q_{gen1[k]} = I(E_0 - V_{1[k]}) \tag{6}$$

At Step S220, the controller 60 sets a theoretical formula of an assumed first outlet temperature value $T_{O1exp[k]}$ shown in the following Expression (7).

[Math. 7]

$$T_{O1exp[k]} = T_{in} + \frac{Q_{gen1[k]}}{\frac{q_{air}}{n} \cdot c_{air}} \tag{7}$$

It is to be noted that as described in the above embodiment, "$q_{air}/n$" in Expression (7) corresponds to the ideal distribution air flow rate described in the first embodiment.

At Step S230, the controller 60 sets a theoretical formula of a first outlet temperature $T_{o1[k]}$ shown in the following Expression (8) on the basis of the first calorific value $Q_{gen1[k]}$ obtained at Step S210.

[Math. 8]

$$T_{O1[k]} = T_{in} + \frac{Q_{gen1[k]}}{q_{air1\_d[k]} \cdot c_{air}} \tag{8}$$

Then, at Step S240, the controller 60 calculates a first individual supply flow rate $q_{air1\_d[k]}$ on the basis of Expressions (7) and (8). Specifically, the first individual supply flow rate $q_{air1\_d[k]}$ is calculated as shown in the following Expression (9).

[Math. 9]

$$q_{air1\_d[k]} = \frac{\frac{q_{air}}{n} \cdot Q_{gen1[k]}}{Q_{gen1[k]} + \frac{q_{air}}{n} \cdot c_{air}(T_{O1[k]} - T_{O1exp[k]})} \tag{9}$$

Therefore, also in the present modification example, the term of the pre-supply air temperature $T_{in}$ included in Expressions (2) and (3) is eliminated, and the controller 60 can calculate the first individual supply flow rate $q_{air1\_d[k]}$ from the pre-distribution air flow rate $q_{air}$, the first outlet temperature $T_{o1[k]}$, the first voltage $V_{1[k]}$, and the current I that are detected values.

In the present modification example, particularly, the above-described Steps S210 to S240 are performed on all integers k that meet 1≤k≤n−1, and thereby all of first individual supply flow rates $q_{air1\_d[1]}$, $q_{air1\_d[2]}$, ..., and $q_{air1\_d[n-1]}$ are found.

Then, at Step S250, the controller 60 calculates a second individual supply flow rate $q_{air2\_d[n]}$ on the basis of the obtained first individual supply flow rates $q_{air1\_d[1]}$, $q_{air1\_d[2]}$, ..., and $q_{air1\_d[n-1]}$. Specifically, as shown in the following Expression (10), the second individual supply flow rate $q_{air2\_d[n]}$ is calculated by subtracting the total sum of the first individual supply flow rates $q_{air1\_d[1]}$, $q_{air1\_d[2]}$, ..., and $q_{air1\_d[n-1]}$ from the pre-distribution air flow rate $q_{air}$.

[Math. 10]

$$q_{air2\_d[n]} = q_{air} - (q_{air1\_d[1]} + q_{air1\_d[2]} + \cdots + q_{air1\_d[n-1]}) \tag{10}$$

Therefore, according to the present modification example, even the fuel cell system 10 provided with the n SOFC stacks 12 can calculate the first individual supply flow rate $q_{air1\_d[k]}$ of the first SOFC stack 12-$k$ whose air outlet temperature (first outlet temperature $T_{o1[k]}$) is detected and also accurately find the second individual supply flow rate $q_{air2\_d[n]}$ on the basis of the total sum of the first individual supply flow rates $q_{air1\_d[k]}$ and the pre-distribution air flow rate $q_{air}$.

That is, according to the present modification example, also in the fuel cell system 10 that distributes air as a refrigerant to the n SOFC stacks 12, particularly, three, four, or any more number of SOFC stacks, it is possible to find the respective first individual supply flow rates $q_{air1\_d[k]}$ of the first SOFC stacks 12-$k$ and the second individual supply flow rate $q_{air2\_d[n]}$ of the second SOFC stack 12-$n$ in which the variation in the flow rate of air due to distribution is reflected. Therefore, it is possible to accurately estimate a flow rate of supplied air to each SOFC stack 12 even if the temperature sensor at the air outlet of the second SOFC stack 12-$n$ is omitted as with the first embodiment.

Second Modification Example

Subsequently, the second modification example of the first embodiment is described.

Figure 5:
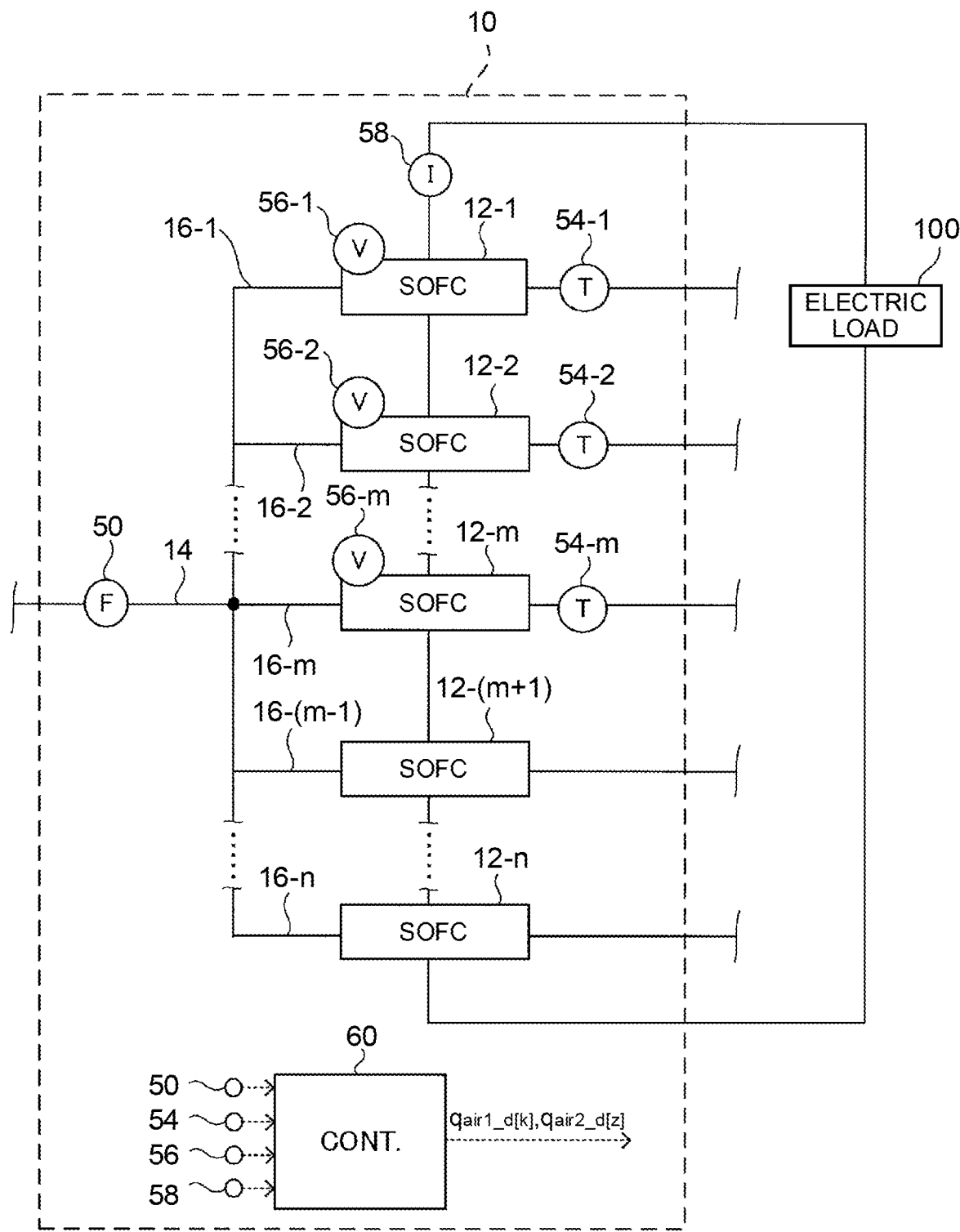
FIG. 5 is a diagram illustrating a configuration of a fuel cell system according to a second modification example.

FIG. 5 is a diagram illustrating a configuration of the fuel cell system 10 according to the second modification example. It is to be noted that a component similar to that of the first embodiment or the first modification example is assigned the same reference numeral, and its description is omitted.

As shown in the drawing, in the present modification example, as with the first modification example, the fuel cell group 12 is composed of the n SOFC stacks 12-1, 12-2, ..., 12-($n$−1), and 12-$n$.

Meanwhile, in the present modification example, the (n−2) or less SOFC stacks 12-1, 12-2, ..., and 12-$m$ (2≤m≤n−2) in the fuel cell group 12 are provided with the first outlet temperature sensors 54-1, 54-2, ..., and 54-$m$, respectively. Furthermore, the other SOFC stacks 12-($m$+1), 12-($m$+2), ..., and 12-$n$ are not provided with a temperature sensor at their air outlet.

Therefore, in the present modification example, the SOFC stacks 12-1, 12-2, ..., and 12-$m$ correspond to the "first SOFC stack". Furthermore, the SOFC stacks 12-($m$+1), 12-($m$+2), ..., and 12-$n$ correspond to the "second SOFC stack". That is, in the present modification example, there are the multiple "second SOFC stacks" provided with no temperature sensor at their air outlet.

It is to be noted that in the present modification example, for the sake of simplicity of description, description about the m first SOFC stacks 12-1, 12-2, ..., and 12-$m$ and their peripheral structure is condensed by using an integer k in a range of 1≤k≤m as needed. Furthermore, description about the (n-m) second SOFC stacks 12-($m$+1), 12-($m$+2), ..., and 12-$n$ and their peripheral structure is condensed by using an integer z in a range of m+1≤z≤n. However, this description holds true for any integers k and z that meet 1≤k≤m and m+1≤z≤n.

Moreover, in the present modification example, the "first SOFC stack 12-1" or the like in the first embodiment is changed into the "first SOFC stack 12-$k$", and the "second SOFC stack 12-2" or the like in the first embodiment is changed into the "second SOFC stack 12-$z$". In accordance with this, the respective reference numerals of the parameters described in the first embodiment are replaced as follows.

"first outlet temperature $T_{o1[1]}$"⇒"first outlet temperature $T_{o1[k]}$"

"first voltage $V_{1[1]}$"⇒"first voltage $V_{1[k]}$"

"first calorific value $Q_{gen1[1]}$"⇒"first calorific value $Q_{gen1[k]}$"

"assumed first outlet temperature value $T_{O1exp[1]}$"⇒"assumed first outlet temperature value $T_{O1exp[k]}$"

"first individual supply flow rate $q_{air1\_d[1]}$"⇒"first individual supply flow rate $q_{air1\_d[k]}$"

"second individual supply flow rate $q_{air2\_d[2]}$"⇒"second individual supply flow rate $q_{air2\_d[z]}$"

Below are described details of calculation of a first individual supply flow rate $q_{air1\_d[k]}$ and a second individual supply flow rate $q_{air2\_d[z]}$ in the present modification example.

Figure 6:
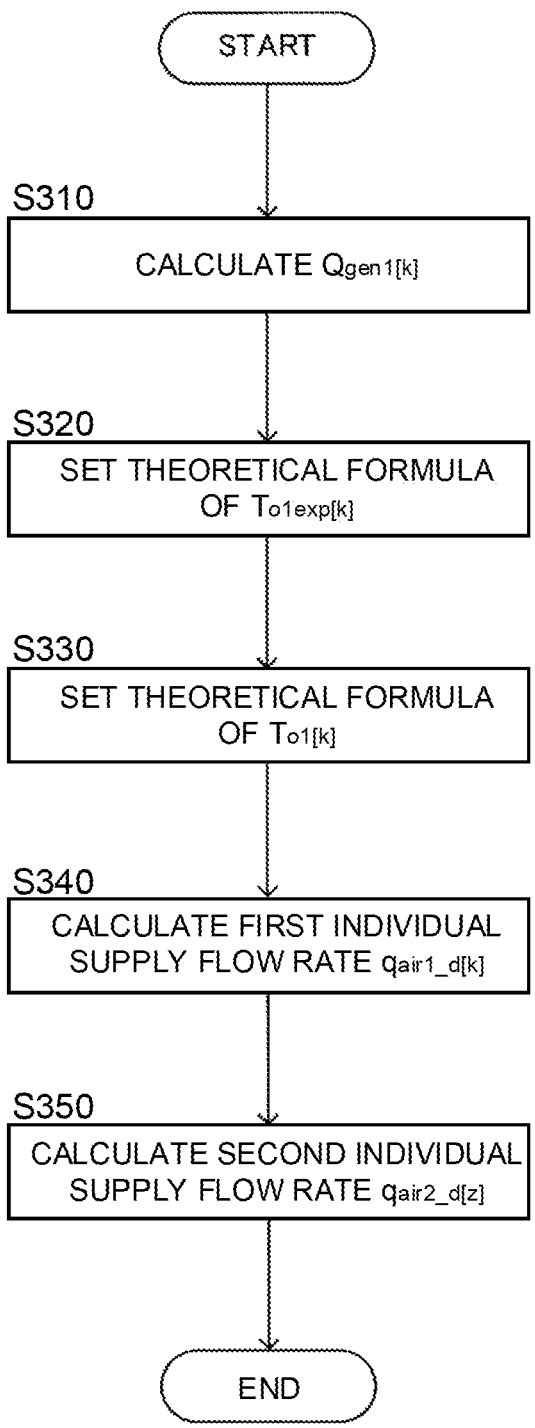
FIG. 6 is a flowchart illustrating the flow of calculation of a first individual supply flow rate and a second individual supply flow rate in the second modification example.

FIG. 6 is a flowchart illustrating the flow of the calculation of the first individual supply flow rate $q_{air1\_d[k]}$ and the second individual supply flow rate $q_{air2\_d[z]}$ in the present modification example.

At Steps S310 to S340 shown in FIG. 6, the controller 60 performs similar processes to the processes at Steps S210 to S240 in FIG. 4 in the first modification example, and calculates respective first individual supply flow rates $q_{air1\_d[k]}$ with respect to all integers k that meet 1≤k≤m. That is, the controller 60 calculates first individual supply flow rates $q_{air1\_d[1]}, q_{air1\_d[2]}, \ldots,$ and $q_{air1\_d[m]}$.

Then, at Step S350, the controller 60 calculates a second individual supply flow rate $q_{air2\_d[z]}$ from the obtained first individual supply flow rates $q_{air1\_d[1]}, q_{air1\_d[2]}, \ldots,$ and $q_{air1\_d[m]}$ on the basis of the following Expression (11).

[Math. 11]

$$q_{air2\_d[z]} = \frac{q_{air} - (q_{air1\_d[1]} + q_{air1\_d[2]} + \ldots + q_{air1\_d[m]})}{n - m} \quad (11)$$

Here, the right side of Expression (11) denotes a value obtained by subtracting the total sum of the first individual supply flow rates $q_{air1\_d[1]}, q_{air1\_d[2]}, \ldots,$ and $q_{air1\_d[m]}$ from the pre-distribution air flow rate $q_{air}$ and then dividing the obtained value by (n−m) that is the number of the second SOFC stacks 12-$z$.

Therefore, the second individual supply flow rate $q_{air2\_d[z]}$ in the present modification example is calculated to be the same value among all the second SOFC stacks 12-$z$ (m+1≤z≤n).

As understood from the above description, in the present embodiment, even in a case where there exist the multiple second SOFC stacks 12-$z$ provided with no temperature sensor at their air outlet, it is possible to calculate the first individual supply flow rate $q_{air1\_d[k]}$ and the second individual supply flow rate $q_{air2\_d[z]}$.

Here, in the present modification example, as for at least all of the first SOFC stacks 12-$k$ (1≤k≤m), it is possible to find an individual flow rate of supplied air that takes variation into consideration. Meanwhile, as described above, as for the second SOFC stacks 12-$z$ (m+1≤z≤n), the same value is obtained as their second individual supply flow rate $q_{air2\_d[z]}$. Therefore, it is not possible to rigorously evaluate variation in the flow rate of supplied air among the second SOFC stacks 12-$z$.

However, depending on the design, etc. of the fuel cell system 10, without having to rigorously evaluate variation in the flow rate of supplied air among some of the second SOFC stacks 12-$z$, there may not be large errors in temperature control, power generation amount control, etc.

In such a case, by adopting the system configuration according to the present modification example, it becomes possible to reduce the number of temperature sensors installed while maintaining the accuracy of temperature control, power generation amount control, etc. As a result, it is possible to further reduce the manufacturing cost and the maintenance cost of the fuel cell system 10.

It is to be noted that in the present modification example, a ratio of the number of first SOFCs 12-$k$ provided with a temperature sensor at their air outlet and the number of second SOFCs 12-$z$ provided with a temperature sensor at their air outlet can be fittingly adjusted depending on the design, etc. of the fuel cell system 10. Accordingly, it is possible to adjust the balance between the high accuracy of temperature control and power generation amount control and the low cost fittingly. For example, if the number of the first SOFCs 12-$k$ and the number of the second SOFCs 12-$z$ are about the same, the number of temperature sensors installed can be about half of that is in a case where all the SOFCs composing the fuel cell group 12 are provided with a temperature sensor at their air outlet.

Third Modification Example

Subsequently, the third modification example of the present embodiment is described.

Figure 7:
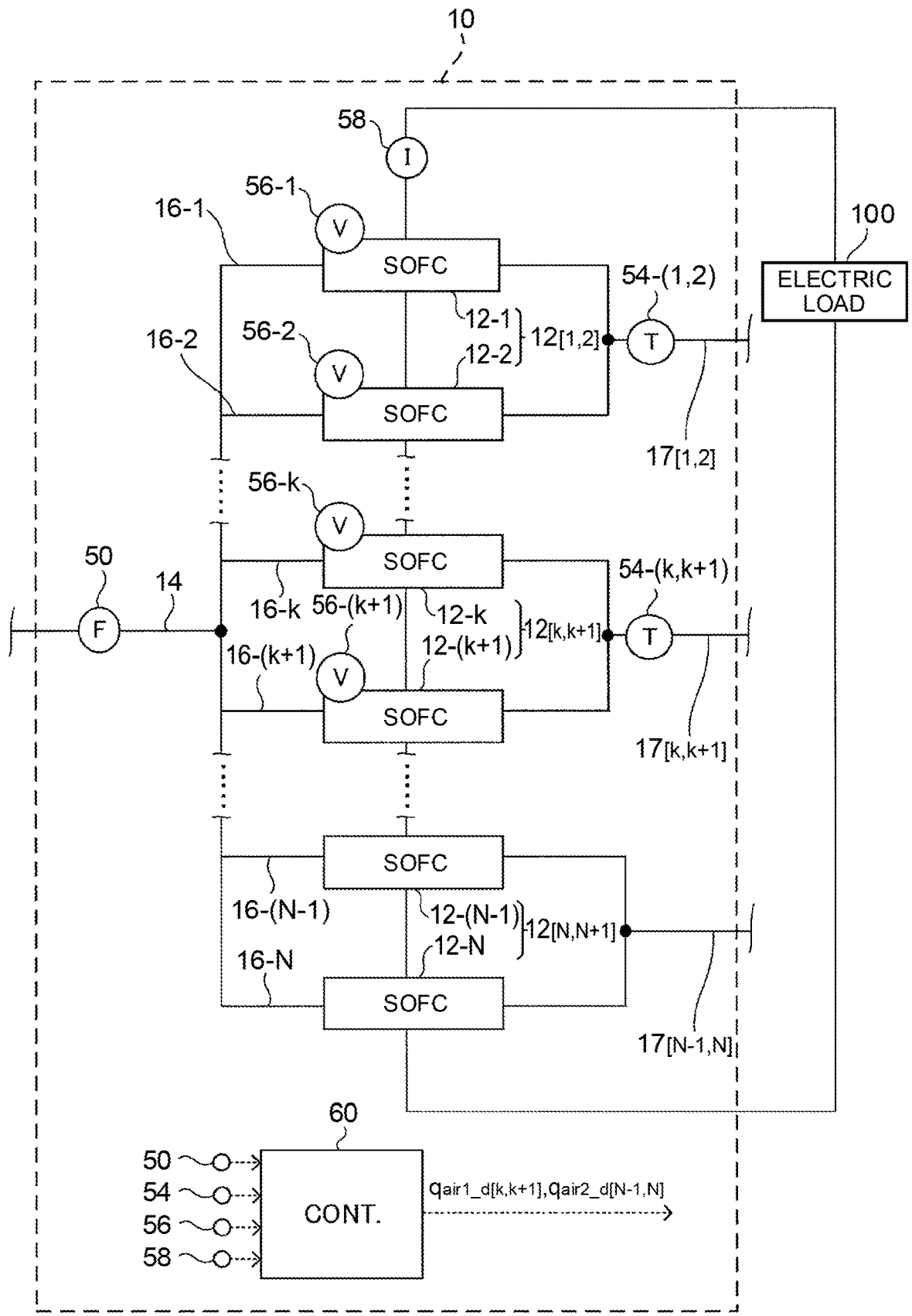
FIG. 7 is a diagram illustrating a configuration of a fuel cell system according to a third modification example.

FIG. 7 is a diagram illustrating a configuration of the fuel cell system 10 according to the third modification example. It is to be noted that a component similar to that of any of the first embodiment and the above-described modification examples 1 and 2 is assigned the same reference numeral, and its description is omitted.

As shown in the drawing, in the third modification example, the number n of the SOFCs disposed in the fuel cell group 12 in the first and second modification examples is set to be n=N ("N" is an even number). That is, the fuel cell group 12 is composed of N SOFC stacks 12-1, 12-2, . . . , and 12-N. Then, the air distribution passage 16 through which air from the air supply passage 14 is distributed to these SOFCs is composed of N passages that are first to Nth distribution paths 16-1 to 16-N corresponding to the N SOFCs.

It is to be noted that in the present modification example, for the sake of simplicity of description, description about the SOFC stacks 12-1, 12-2, . . . , and 12-(N−2) and their peripheral structure is condensed by using an integer k in a range of 1≤k≤N−2 as needed. However, this description holds true for any integer k that meets 1≤k≤N−2.

The fuel cell system 10 according to the present modification example includes a merging path $17_{[k,\,k+1]}$. In an SOFC group $12_{[k,\,k+1]}$ composed of two SOFC stacks 12-$k$ and 12-($k$+1), distribution paths 16-$k$ and 16-($k$+1) for supplying air to the SOFC stacks 12-$k$ and 12-($k$+1) are merged into the merging path $17_{[k,\,k+1]}$ at outlets of the SOFC stacks 12-$k$ and 12-($k$+1).

Furthermore, the merging path $17_{[k,\ k+1]}$ is provided with a first outlet temperature sensor $54_{[k,\ k+1]}$ that detects an air temperature of the merging path $17_{[k,\ k+1]}$. Furthermore, the SOFC stacks 12-$k$ and 12-($k$+1) are each provided with a voltage sensor 56-$k$.

That is, in the present modification example, the air temperature in the merging path $17_{[k,\ k+1]}$ where the air from the SOFC group $12_{[k,\ k+1]}$ composed of the two SOFC stacks 12-$k$ and 12-($k$+1) is merged is detected as a "first outlet temperature".

Therefore, in the present modification example, the SOFC group $12_{[k,\ k+1]}$ composed of the two SOFC stacks 12-$k$ and 12-($k$+1) in the condition of 1≤$k$≤N−2 corresponds to the "first SOFC stack".

Meanwhile, no temperature sensor is provided in a merging path $17_{[N-1,\ N]}$ where air from an SOFC group $12_{[N-1,\ N]}$ composed of two SOFC stacks 12-(N−1) and 12-N is merged. Therefore, in the present modification example, the SOFC group $12_{[N-1,\ N]}$ corresponds to the "second SOFC stack". Hereinafter, the "SOFC group $12_{[k,\ k+1]}$" and the "SOFC group $12_{[N-1,\ N]}$" are referred to as the "first SOFC group $12_{[k,\ k+1]}$" and the "second SOFC group $12_{[N-1,\ N]}$", respectively.

Furthermore, in the following description, the respective reference numerals of the parameters described in the first embodiment or each of the above-described modification examples are replaced as follows.

"first outlet temperature $T_{o1[1]}$"⇒"first outlet temperature $T_{o1[k,\ k+1]}$"

"first voltage $V_{1[1]}$"⇒"first voltage $V_{1[k,\ k+1]}$"

"first calorific value $Q_{gen1[1]}$"⇒"first calorific value $Q_{gen1[k,\ k+1]}$"

"assumed first outlet temperature value $T_{O1exp[1]}$"⇒"assumed first outlet temperature value $T_{O1exp[k,\ k+1]}$"

"first individual supply flow rate $q_{air1\_d[1]}$"⇒"first individual supply flow rate $q_{air1\_d[k,\ k+1]}$"

"second individual supply flow rate $q_{air2\_d[2]}$"⇒"second individual supply flow rate $q_{air2\_d[N-1,\ N]}$"

It is to be noted that in the present modification example, a "first voltage $V_{1[k,\ k+1]}$" of the first SOFC group $12_{[k,\ k+1]}$ corresponds to "$V_{1[k]}+V_{1[k+1]}$" that is the sum of a first voltage $V_{1[k]}$ of the SOFC stack 12-$k$ and a first voltage $V_{1[k+1]}$ of the SOFC stack 12-($k$+1) in the first modification example.

Furthermore, in the present modification example, a "first calorific value $Q_{gen1[k,\ k+1]}$" of the first SOFC group $12_{[k,\ k+1]}$ corresponds to "$Q_{gen1[k,\ k+1]}+Q_{gen1[k+1]}$" that is the sum of a "first calorific value $Q_{gen1[k]}$" of the SOFC stack 12-$k$ and a "first calorific value $Q_{gen1[k+1]}$" of the SOFC stack 12-($k$+1) in the first modification example.

Below are described details of calculation of a first individual supply flow rate $q_{air1\_d[k,\ k+1]}$ and a second individual supply flow rate $q_{air2\_d[N-1,\ N]}$ in the present modification example.

Figure 8:
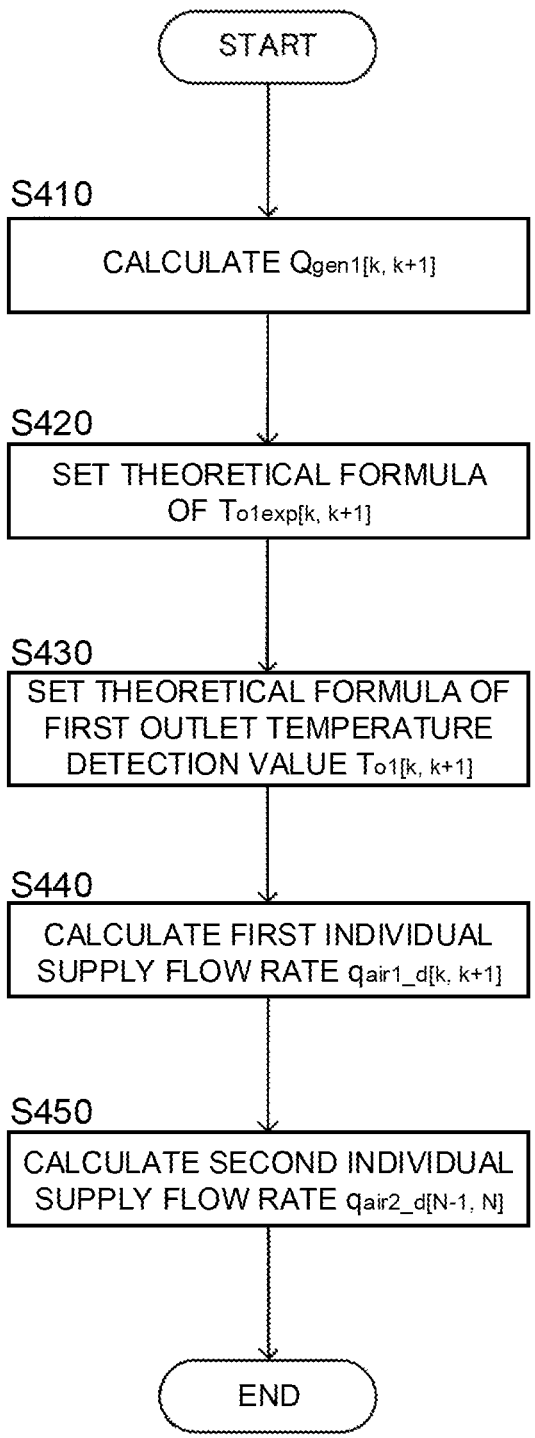
FIG. 8 is a flowchart illustrating the flow of calculation of a first individual supply flow rate and a second individual supply flow rate in the third modification example.

FIG. 8 is a flowchart illustrating the flow of the calculation of the first individual supply flow rate $q_{air1\_d[k,\ k+1]}$ and the second individual supply flow rate $q_{air2\_d[N-1,\ N]}$ in the present modification example.

At Step S410, the controller 60 calculates a first calorific value $Q_{gen1[k,\ k+1]}$ due to power generation of the first SOFC group $12_{[k,\ k+1]}$ on the basis of a first voltage $V_{1[k+1]}$ and a current I. Specifically, the controller 60 calculates a first calorific value $Q_{gen1[k,\ k+1]}$, replacing "$V_{1[k]}$" and "$E_0$" on the right side of Expression (6) described in the first modification example with "$V_{1[k]}+V_{1[k+1]}$" and "$2E_0$", respectively.

Furthermore, the controller 60 performs processes at Steps S420 to S450 in a similar way, replacing the respective parameters of Expressions (7) to (10) used at Steps S220 to S250 in the first modification example with the ones defined in the present modification example fittingly.

In the present embodiment, particularly, with two SOFCs as one group, the first SOFC groups $12_{[k,\ k+1]}$ and the second SOFC groups $12_{[N-1,\ N]}$ are an object of detection; therefore, an above-described ideal distribution air flow rate is determined on the basis of "N/2" that is the total number of these groups. That is, in Expressions (7) to (10), "$q_{air}/n$" denoting the ideal distribution air flow rate is replaced with "$2q_{air}/N$".

Through the above-described processes at Steps S410 to S450, the first individual supply flow rate $q_{air1\_d[k,\ k+1]}$ and the second individual supply flow rate $q_{air2\_d[N-1,\ N]}$ can be suitably calculated.

Therefore, also in the present modification example, it is possible to calculate the first individual supply flow rate $q_{air1\_d[k,\ k+1]}$ of the first SOFC group $12_{[k,\ k+1]}$ provided with the outlet temperature sensor and also accurately estimate the second individual supply flow rate $q_{air2\_d[N-1,\ N]}$ of the second SOFC group $12_{[N-1,\ N]}$ on the basis of the total sum of the first individual supply flow rates $q_{air1\_d[k,\ k+1]}$ and the pre-distribution air flow rate $q_{air}$.

Here, in the present modification example, the first individual supply flow rate $q_{air1\_d[k,\ k+1]}$ and the second individual supply flow rate $q_{air2\_d[N-1,\ N]}$ are estimated in units of the first SOFC group $12_{[k,\ k+1]}$ and the second SOFC group $12_{[N-1,\ N]}$ with two SOFCs as one group. Therefore, it is not possible to rigorously evaluate variation in the flow rate of supplied air among single SOFCs composing the fuel cell group 12.

However, depending on the design, etc. of the fuel cell system 10, without having to rigorously evaluate variation in the flow rate of supplied air among single SOFCs, there may not be large errors in temperature control, power generation amount control, etc. In such a case, by adopting the system configuration according to the present modification example, it becomes possible to reduce the number of temperature sensors installed while maintaining the accuracy of temperature control and power generation amount control. In particular, as in the present modification example, the first outlet temperature sensor $54_{[k,\ k+1]}$ is provided for each first SOFC group $12_{[k,\ k+1]}$ with two SOFCs as one group, and thus the number of temperature sensors installed can be reduced by more than half. As a result, it is possible to further enhance the cost suppressing effect.

It is to be noted that in the present modification example, with two SOFCs as one group, the first SOFC groups $12_{[k,\ k+1]}$ and the second SOFC groups $12_{[N-1,\ N]}$ are provided. However, with three or more SOFCs as one group, first SOFC groups and second SOFC groups 12 may be provided. Furthermore, the number of SOFCs included in each SOFC group may be different among the SOFC groups.

Second Embodiment

A second embodiment is described below. It is to be noted that a component similar to that of any of the first embodiment and the first to third modification examples is assigned the same reference numeral, and its description is omitted.

Figure 9:
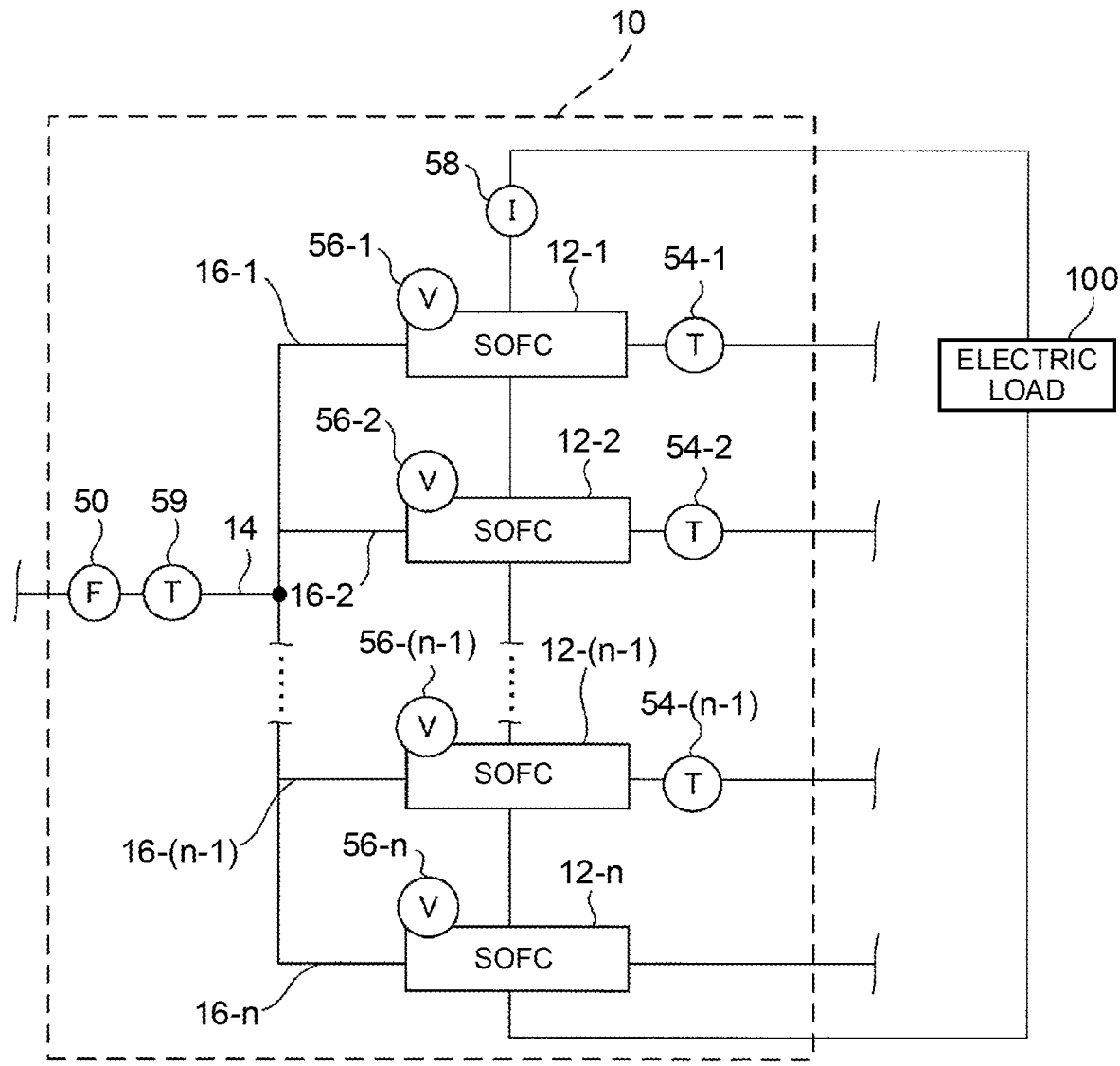
FIG. 9 is a diagram illustrating a configuration of a fuel cell system according to a second embodiment.

FIG. 9 is a diagram illustrating a configuration of the fuel cell system 10 according to the second embodiment.

As shown in the drawing, the fuel cell system 10 according to the present embodiment is based on the configuration of the fuel cell system 10 according to the first modification example illustrated in FIG. 3. In particular, the fuel cell system 10 according to the present embodiment includes a pre-supply refrigerant temperature sensor 59 that detects a pre-supply air temperature $T_{in}$ that is an air temperature in the air supply passage 14 and a voltage sensor 56-$n$ that detects a second voltage $V_{2[n]}$ that is a voltage of the second SOFC stack 12-$n$, in addition to the configuration of the fuel cell system 10 according to the first modification example.

Furthermore, the controller 60 according to the present embodiment acquires the pre-supply air temperature $T_{in}$ from the pre-supply refrigerant temperature sensor 59 and the second voltage $V_{2[n]}$ from the voltage sensor 56-$n$, besides respective detection signals from the sensors described in the first modification example.

Then, the controller 60 calculates (estimates) a second outlet temperature $T_{o2exp[n]}$ that is an air outlet temperature of the second SOFC stack 12-$n$ on the basis of the pre-supply air temperature $T_{in}$, the second voltage $V_{2[n]}$, and a first individual supply flow rate $q_{air1\_d[k]}$ (k=1 to n) and a second individual supply flow rate $q_{air2\_d[n]}$ that are found by executing the steps in FIG. 4 described in the first modification example.

Figure 10:
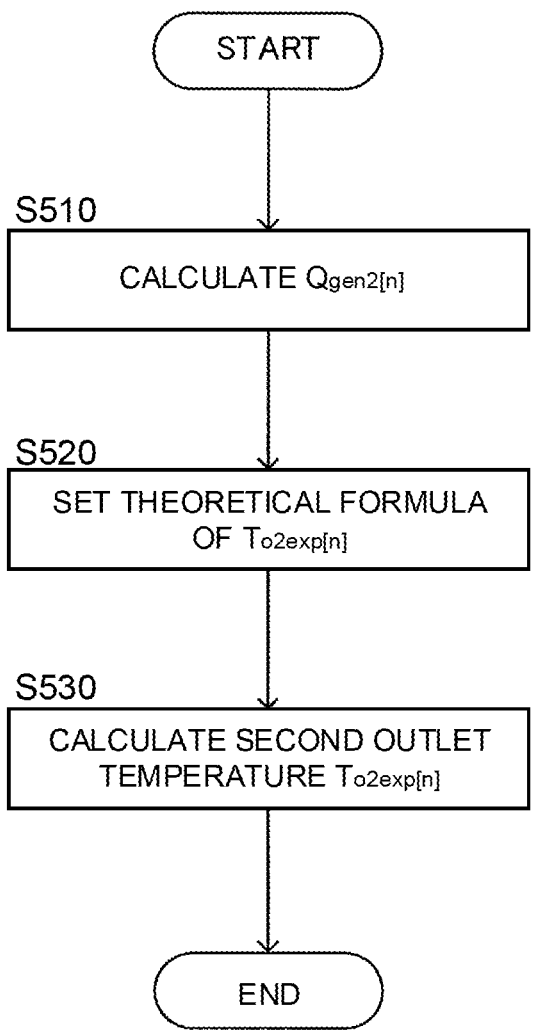
FIG. 10 is a flowchart illustrating the flow of calculation of a second outlet temperature in the second embodiment.

FIG. 10 is a flowchart illustrating the flow of the calculation of the second outlet temperature $T_{o2exp[n]}$ in the present embodiment.

At Step S510, using the following Expression (12), the controller 60 calculates a second calorific value $Q_{gen2[n]}$ due to power generation of the second SOFC stack 12-$n$ on the basis of a second voltage $V_{2[n]}$ and a current I.

[Math. 12]

$$Q_{gen2[k]} = I(E_0 - V_{2[n]}) \quad (12)$$

It is to be noted that the calculation of this second calorific value $Q_{gen2[n]}$ may be performed in advance, for example, in a stage of Step S210 in FIG. 4.

At Step S520, the controller 60 sets a theoretical formula of a second outlet temperature $T_{O2exp[n]}$ shown in the following Expression (13).

[Math. 13]

$$T_{O2exp[n]} = T_{in} + \frac{Q_{gen2[n]}}{q_{air2\_d[n]} \cdot c_{air}} \quad (13)$$

Then, at Step S530, the controller 60 calculates the second outlet temperature $T_{O2exp[n]}$ using the already-calculated second individual supply flow rate $q_{air2\_d[n]}$ in Expression (13).

That is, the second outlet temperature $T_{O2exp[n]}$ can be calculated by substituting the second individual supply flow rate $q_{air2\_d[n]}$ calculated in Expressions (9) and (10) for Expression (13).

It is to be noted that for example, in a case where the fuel cell group 12 is composed of two SOFC stacks 12-1 and 12-2, "n=2"; therefore, the second outlet temperature $T_{O2exp[n]}$ in this case is determined as shown in the following Expression (14).

[Math. 14]

$$T_{O2exp[2} = T_{in} + \frac{Q_{gen2[2]}\{2Q_{gen1[1]} + q_{air} \cdot c_{air}(T_{O1[1]} - T_{O1[1]exp})\}}{q_{air} \cdot c_{air}\{Q_{gen1[1]} + q_{air} \cdot c_{air}(T_{O1[1]} - T_{O1[1]exp})\}} \quad (14)$$

The fuel cell system 10 according to the present embodiment described above achieves the following functions and effects.

The fuel cell system 10 according to the present embodiment further includes the pre-supply refrigerant temperature sensor 59 as a pre-supply refrigerant temperature detecting unit that detects a pre-supply air temperature $T_{in}$ as a pre-supply refrigerant temperature that is a temperature of a refrigerant before it is supplied to the SOFC stacks 12-1 to 12-$n$.

Furthermore, the voltage sensor 56-$n$ as a voltage acquiring unit detects a second voltage $V_{2[n]}$ that is a voltage of the second SOFC stack 12-$n$. Moreover, the current sensor 58 as a current acquiring unit detects a current I as a second current of the second SOFC stack 12-$n$.

Then, the controller 60 calculates a second outlet temperature $T_{O2exp[n]}$ that is an air outlet temperature of the second SOFC stack 12-$n$ on the basis of the second voltage $V_{2[n]}$, the current I, the pre-supply air temperature $T_{in}$, and the second individual supply flow rate first individual supply flow rate (Steps S510 to S520 in FIG. 10).

Accordingly, it is possible to estimate the second outlet temperature $T_{O2exp[n]}$ that is an air outlet temperature of the second SOFC stack 12-$n$ provided with no outlet temperature sensor.

In particular, the second individual supply flow rate $q_{air2\_d[n]}$ in which the above-described variation in the flow rate of distributed air is reflected is used in the calculation of the second outlet temperature $T_{o2exp[n]}$; therefore, it is possible to obtain the accurate second outlet temperature $T_{o2exp[n]}$ that takes into consideration the variation in the flow rate of distributed air. That is, this can be accurately estimated without having to detect an outlet temperature of the second SOFC stack 12-$n$. As a result, it is possible to acquire an accurate air outlet temperature of the second SOFC stack 12-$n$ provided with no outlet temperature sensor while reducing the number of temperature sensors at the air outlets of the second SOFC stacks 12-$n$ and thereby reducing the cost.

It is to be noted that in the present embodiment, there is described an example where a second outlet temperature $T_{o2exp[n]}$ is calculated in the fuel cell system 10 based on the configuration of the first modification example. However, a second outlet temperature may be calculated in the fuel cell system 10 based on the configuration of the first embodiment, the configuration of the second modification example, or the configuration of the third modification example as well. Also in these cases, a second outlet temperature can be calculated by performing processes similar to those at Steps S510 to S530 in the present embodiment.

Third Embodiment

A third embodiment is described below. It is to be noted that a component similar to that of any of the above-described embodiments and the modification examples is assigned the same reference numeral, and its description is omitted.

Figure 11:
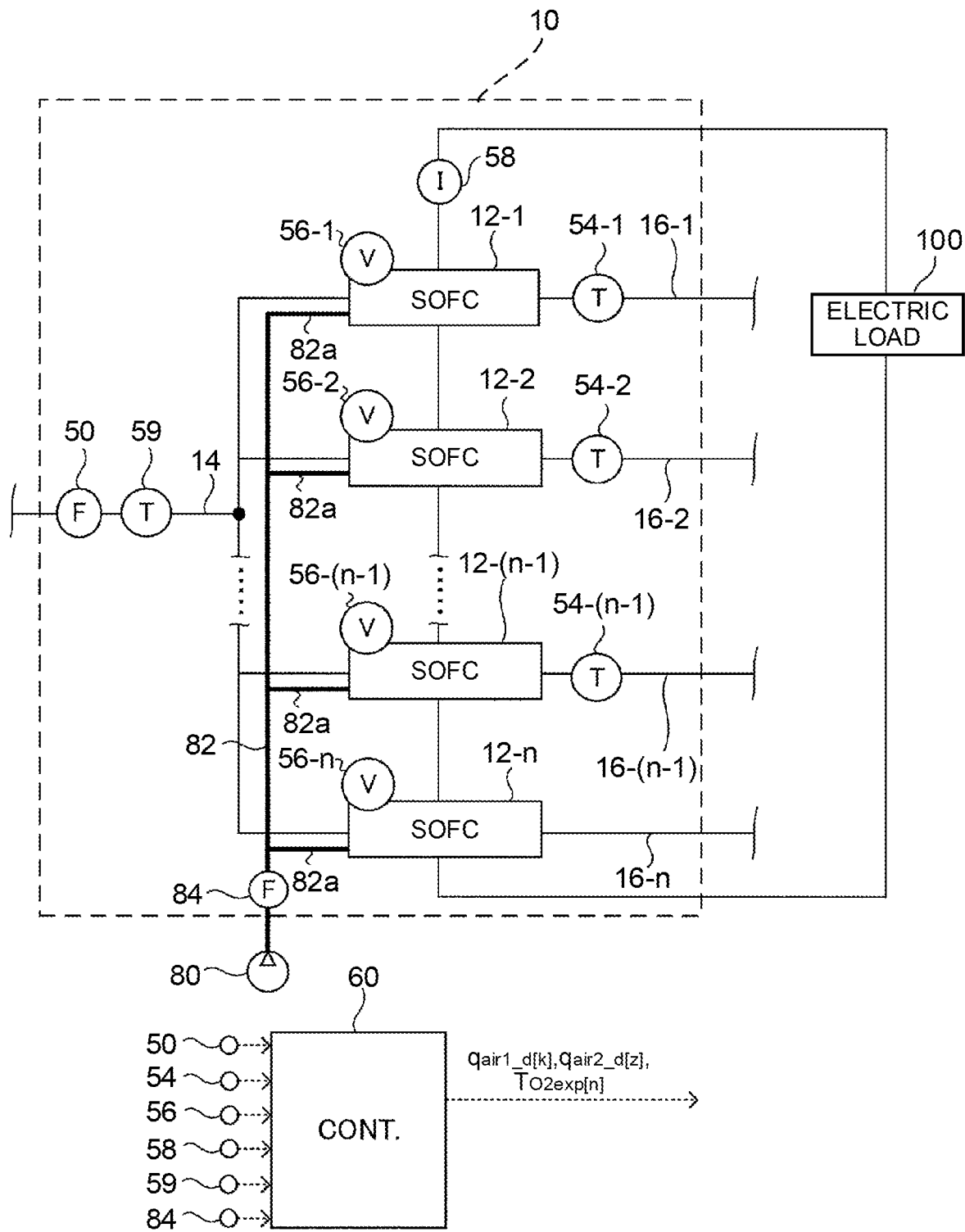
FIG. 11 is a diagram illustrating a configuration of a fuel cell system according to a third embodiment.

FIG. 11 is a diagram illustrating a configuration of the fuel cell system 10 according to the third embodiment.

As shown in the drawing, the fuel cell system 10 according to the present embodiment includes a fuel supply system that supplies fuel (fuel gas) for power generation to the SOFC stacks 12-1 to 12-$n$, in addition to the configuration of the second fuel cell system 10 illustrated in FIG. 9.

Specifically, the fuel supply system in the present embodiment includes a fuel pump 80, a fuel supply passage 82 that is a passage through which fuel is supplied from the fuel pump 80 to the SOFC stacks 12-1 to 12-n, and a fuel flow rate sensor 84 that detects a flow rate of fuel fed from the fuel pump 80 into the fuel supply passage 82. Hereinafter, the flow rate of fuel detected by the fuel flow rate sensor 84 is also referred to as a "total supply fuel flow rate $q_{fuel}$".

Furthermore, the fuel supply passage 82 includes fuel distribution pipes 82a through which fuel is individually distributed to the SOFC stacks 12-1 to 12-n. It is to be noted that the fuel distribution pipes 82a are each provided with a device (not shown) such as an injector or an opening degree control valve that controls fuel supply to the corresponding SOFC stack 12. By controlling these devices individually or collectively, respective distribution flow rates of fuel supply to SOFC stacks 12-1 to 12-n can be adjusted.

Then, in the fuel cell system 10 according to the present embodiment, the controller 60 acquires a total supply fuel flow rate $q_{fuel}$ that is a detected value of the fuel flow rate sensor 84 besides respective detection signals from the sensors described in the second embodiment.

Furthermore, the controller 60 according to the present embodiment calculates a heat capacity of supply fuel on the basis of the total supply fuel flow rate $q_{fuel}$, and corrects a first calorific value $Q_{gen1[k]}$ and a second calorific value $Q_{gen2[n]}$ on the basis of the heat capacity of supply fuel. Its details are described below.

Figure 12:
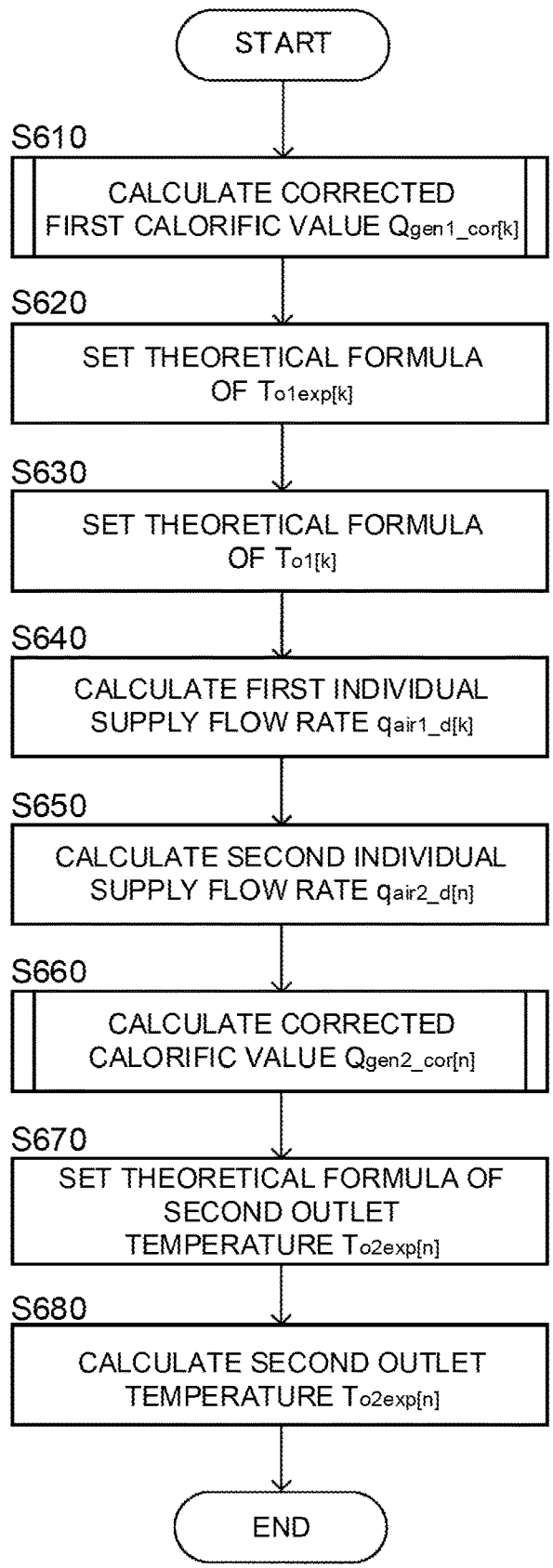
FIG. 12 is a flowchart illustrating the flow of calculation of a first individual supply flow rate, a second individual supply flow rate, and a second outlet temperature in the third embodiment.

FIG. 12 is a flowchart illustrating a method of calculating a first individual supply flow rate $q_{air1\_d[k]}$, a second individual supply flow rate $q_{air2\_d[n]}$, and a second outlet temperature $T_{o2exp[n]}$, including a process of correcting a first calorific value $Q_{gen1[k]}$ and a second calorific value $Q_{gen2[n]}$.

At Step S610, the controller 60 calculates a corrected first calorific value $Q_{gen1\_cor[k]}$ from a first calorific value $Q_{gen1[k]}$. Specifically, as with Step S210 (FIG. 4) described in the first modification example, on the basis of Expression (6), the controller 60 first calculates a first calorific value $Q_{gen1[k]}$ on the basis of a first voltage $V_{1[k]}$ and a first current I.

Furthermore, on the basis of the following Expression (15), the controller 60 calculates a corrected first calorific value $Q_{gen1\_cor[k]}$ by correcting the calculated first calorific value $Q_{gen1[k]}$ using a total supply fuel flow rate $q_{fuel}$ detected by the fuel flow rate sensor 84.

[Math. 15]

$$Q_{gen1\_cor[k]} = Q_{gen1[k]}\left(1 - \frac{C_{fuel1[k]}}{C_{air1[k]}}\right) \quad (15)$$

However, "$C_{fuel1[k]}$" in Expression (15) denotes a heat capacity of fuel supplied to the first SOFC stack 12-k. Hereinafter, this heat capacity is also referred to as a "first SOFC supply fuel heat capacity $C_{fuel1[k]}$".

Here, the controller 60 can calculate the first SOFC supply fuel heat capacity $C_{fuel[k]}$ on the basis of the following Expression (16).

[Math. 16]

$$C_{fuel1[k]} = c_{fuel} \cdot \frac{q_{fuel}}{n} \quad (16)$$

In Expression (16), "$c_{fuel}$" denotes a specific heat capacity of fuel supplied to the first SOFC stack 12-k. Hereinafter, this is also referred to as a "fuel specific heat $c_{fuel}$". A fixed value determined in an experiment or the like in advance is used as the "fuel specific heat $c_{fuel}$" in the present embodiment. In the present embodiment, particularly, for the sake of simplicity of calculation, the "fuel specific heat $c_{fuel}$" is set to be the same value among the SOFC stacks 12-1 to 12-n.

Furthermore, in Expression (16), $q_{fuel}/n$ on the right side, which is obtained by dividing the total supply fuel flow rate $q_{fuel}$ by n that is the number of all stacks, corresponds to a flow rate of fuel supplied to one SOFC stack. Therefore, according to Expression (16), by multiplying this $q_{fuel}/n$ by the fuel specific heat $c_{fuel}$, a first SOFC supply fuel heat capacity fuel, $C_{fuel1[k]}$ that is a heat capacity of fuel supplied to the first SOFC stack 12-k can be calculated.

Meanwhile, to return to Expression (15), "$C_{air1[k]}$" denotes a heat capacity of air supplied to the first SOFC stack 12-k. Hereinafter, this is also referred to as a "first SOFC supply air heat capacity $C_{air1[k]}$".

Here, the controller 60 can calculate the first SOFC supply air heat capacity $C_{air1[k]}$ on the basis of the following Expression (17).

[Math. 17]

$$C_{air1[k]} = c_{air} \cdot \frac{q_{air}}{n} \quad (17)$$

In Expression (17), "$q_{air}/n$" on the right side corresponds to the already-described ideal distribution air flow rate. According to Expression (17), by multiplying this ideal distribution air flow rate $q_{air}/n$ by the air specific heat $c_{air}$, the first SOFC supply air heat capacity $C_{air1[k]}$ that is a heat capacity of air supplied to the first SOFC stack 12-k can be calculated.

Therefore, the controller 60 can calculate a corrected first calorific value $Q_{gen1\_cor[k]}$ by applying the first SOFC supply fuel heat capacity $C_{fuel1[k]}$ obtained by Expression (16), the first SOFC supply air heat capacity $C_{air1[k]}$ obtained by Expression (17), and the first calorific value $Q_{gen1[k]}$ to Expression (15).

The meaning of calculating such a corrected first calorific value $Q_{gen1\_cor[k]}$ is described.

In a basic operating state of the fuel cell system 10, a flow rate of fuel supplied to the anode of the first SOFC stack 12-k is reduced by about ten orders as compared with a flow rate of air supplied to the cathode of the first SOFC stack 12-k. That is, it may be said that basically, a heat capacity of fuel supplied to the first SOFC stack 12-k is negligibly small as compared with a heat capacity of air supplied to the first SOFC stack 12-k.

Therefore, even a model based on the assumption that heat generated by the first SOFC stack 12-k is normally transmitted to only air virtually supplied to the first SOFC stack 12-k and not transmitted to fuel does not often cause large errors in the first individual supply flow rate $q_{air1\_d[k]}$, the second individual supply flow rate $q_{air2\_d[n]}$, and the second outlet temperature $T_{o2exp[n]}$ that are calculated as a result.

However, under a special operating state, for example, such as at the time of high load, for example, if the flow rate of fuel supplied to the first SOFC stack 12-k is increased, the heat capacity of fuel becomes higher than usual, and therefore, it can also be in a state that heat transmission to the fuel becomes not negligible.

On the other hand, in the present embodiment, the corrected first calorific value $Q_{gen1\_cor[k]}$ that takes heat transmission to fuel into consideration is found, and therefore, even in a case where heat transmission to the fuel is not negligible, it is possible to calculate the first individual supply flow rate $q_{air1\_d[k]}$, the second individual supply flow rate $q_{air2\_d[n]}$, and the second outlet temperature $T_{o2exp[n]}$ with high accuracy.

It is to be noted that as can be seen from Expression (15), as for $(1-C_{fuel1[k]}/C_{air1[k]})$ on the right side, in a case where heat transmitted to fuel is negligible, it can be considered that the SOFC supply fuel heat capacity $C_{fuel} \approx 0$; therefore, the corrected first calorific value $Q_{gen1\_cor[k]}$ substantially agrees with the first calorific value $Q_{gen1[k]}$.

On the other hand, in a case where heat transmitted to fuel is not negligible, $(1-C_{fuel1[k]}/C_{air1[k]}) < 1$, and thus the corrected first calorific value $Q_{gen1\_cor[k]} <$ the first calorific value $Q_{gen1[k]}$. That is, the transmission of heat of the first SOFC stack 12-$k$ to fuel is reflected in the corrected first calorific value $Q_{gen1\_cor[k]}$. Therefore, in the calculation of the subsequent first individual supply flow rate $q_{air1\_d[k]}$, etc., the corrected first calorific value $Q_{gen1\_cor[k]}$ that has been reduced by the transmission to the fuel can be used, and therefore, the accuracy of estimation of the first individual supply flow rate $q_{air1\_d[k]}$, etc. is further improved.

Next, the controller 60 performs processes at Steps S620 to S650 using the corrected first calorific value $Q_{gen1\_cor[k]}$. Specifically, the controller 60 performs processes similar to Steps S220 to S250 in the above-described first modification example, replacing the "first calorific value $Q_{gen1[k]}$" with the "corrected first calorific value $Q_{gen1\_cor[k]}$". That is, the controller 60 performs respective calculations based on the above-described Expressions (7) to (10), and calculates a first individual supply flow rate $q_{air1\_d[k]}$ and a second individual supply flow rate $q_{air2\_d[n]}$.

Next, at Step S660, the controller 60 finds a corrected second calorific value $Q_{gen2\_cor[n]}$ in a similar way to the above-described Step S610.

That is, the controller 60 calculates a corrected second calorific value $Q_{gen2\_cor[n]}$ on the basis of a second calorific value $Q_{gen2[n]}$ of the second SOFC stack 12-$n$, determining a second SOFC supply fuel heat capacity $C_{fuel2[n]}$ as a heat capacity of fuel supplied to the second SOFC stack 12-$n$ and a second SOFC supply air heat capacity $C_{air2[n]}$ as a heat capacity of air supplied to the second SOFC stack 12-$n$.

Then, at Steps S670 and S680, the controller 60 calculates a second outlet temperature $T_{o2exp[n]}$ in a similar way to Steps S520 and S530 (see FIG. 10) described in the second embodiment.

Accordingly, it is possible to estimate the second outlet temperature $T_{o2exp[n]}$ that is an air outlet temperature of the second SOFC stack 12-$n$ with higher accuracy, taking into consideration the transmission to fuel supplied to the SOFC stack 12.

The fuel cell system 10 according to the present embodiment described above achieves the following functions and effects.

The fuel cell system 10 according to the present embodiment further includes the fuel flow rate sensor 84 as a fuel flow rate acquiring unit that detects a total supply fuel flow rate $q_{fuel}$ as a flow rate of fuel supplied to the fuel cell group 12.

Then, the controller 60 calculates a first SOFC supply fuel heat capacity $C_{fuel1[k]}$ and a second SOFC supply fuel heat capacity $C_{fuel2[n]}$ that are a heat capacity of fuel on the basis of the total supply fuel flow rate $q_{fuel}$, and corrects the first individual supply flow rate $q_{air1\_d[k]}$, the second individual supply flow rate $q_{air2\_d[n]}$, and the second outlet temperature $T_{o2exp[n]}$ on the basis of the first SOFC supply fuel heat capacity $C_{fuel1[k]}$ and the second SOFC supply fuel heat capacity $C_{fuel2[n]}$ (Steps S610 to S680 in FIG. 12).

Therefore, even in a case where thermal energy transmitted to fuel is not negligible with respect to thermal energy transmitted to air because of the operating states of the SOFC stacks 12-1 to 12-$n$, it is possible to accurately calculate a first individual supply flow rate $q_{air1\_d[k]}$, a second individual supply flow rate $q_{air2\_d[n]}$, and a second outlet temperature $T_{o2exp[n]}$ that take into consideration the thermal energy transmitted to the fuel.

It is to be noted that in the above-described embodiment, there is described a case where both a first calorific value $Q_{gen1[k]}$ and a second calorific value $Q_{gen2[n]}$ are corrected; however, only either one of them may be corrected. For example, in a case where the second outlet temperature $T_{o2exp[n]}$ is not be used as a parameter because of an aspect of intended control, a corrected first calorific value $Q_{gen1\_cor[k]}$ obtained by correcting the first calorific value $Q_{gen1[k]}$ may be calculated, and the processes up to Step S650 shown in FIG. 12 may be performed.

Furthermore, in the fuel cell system 10 according to the present embodiment, the fuel flow rate sensor 84 is provided to detect a total supply fuel flow rate $q_{fuel}$. However, the total supply fuel flow rate $q_{fuel}$ may be estimated by another means without providing the fuel flow rate sensor 84. For example, the total supply fuel flow rate $q_{fuel}$ may be estimated on the basis of changes in the fuel level of a fuel tank (not shown) as a fuel supply source or a duty ratio of the fuel pump 80.

Moreover, in the present embodiment, in calculation of a first SOFC supply fuel heat capacity $C_{fuel1[k]}$ and a second SOFC supply fuel heat capacity $C_{fuel2[n]}$ on the basis of the above-described Expression (16), a flow rate of fuel supplied to each SOFC stack 12 is assumed to be $q_{fuel}/n$.

However, for example, an injector, an opening degree control valve, or the like may be provided in each of the fuel distribution pipes 82$a$, and respective individual supply fuel flow rates of the SOFC stacks 12-1 to 12-$n$ may be estimated from respective individual fuel flow rate control amounts for the SOFC stacks 12-1 to 12-$n$, and then, with respect to each individual stack, a first SOFC supply fuel heat capacity $C_{fuel1[k]}$ and a second SOFC supply fuel heat capacity $C_{fuel2[n]}$ may be calculated on the basis of the individual supply fuel flow rates.

Furthermore, in calculation of a first SOFC supply fuel heat capacity $C_{fuel1[k]}$ and a second SOFC supply fuel heat capacity $C_{fuel2[n]}$ using Expression (17), the ideal distribution air flow rate $q_{air}/n$ on the right side may be replaced with a value of a flow rate of air that takes into consideration the variation in the flow rate of air among the SOFC stacks 12-1 to 12-$n$.

For example, a preliminary first individual supply flow rate $q_{air1\_d[k]}$ and a preliminary second individual supply flow rate $q_{air2\_d[n]}$ may be calculated from the uncorrected first calorific value $Q_{gen1[k]}$ and the uncorrected second calorific value $Q_{gen2[n]}$ in the present embodiment by a similar method to the first modification example, and these preliminary flow rates of air may be used instead of the ideal distribution air flow rate $q_{air}/n$ on the right side.

Fourth Embodiment

A fourth embodiment is described below. It is to be noted that a component similar to that of any of the above-described embodiments and the modification examples is assigned the same reference numeral, and its description is omitted.

Figure 13:
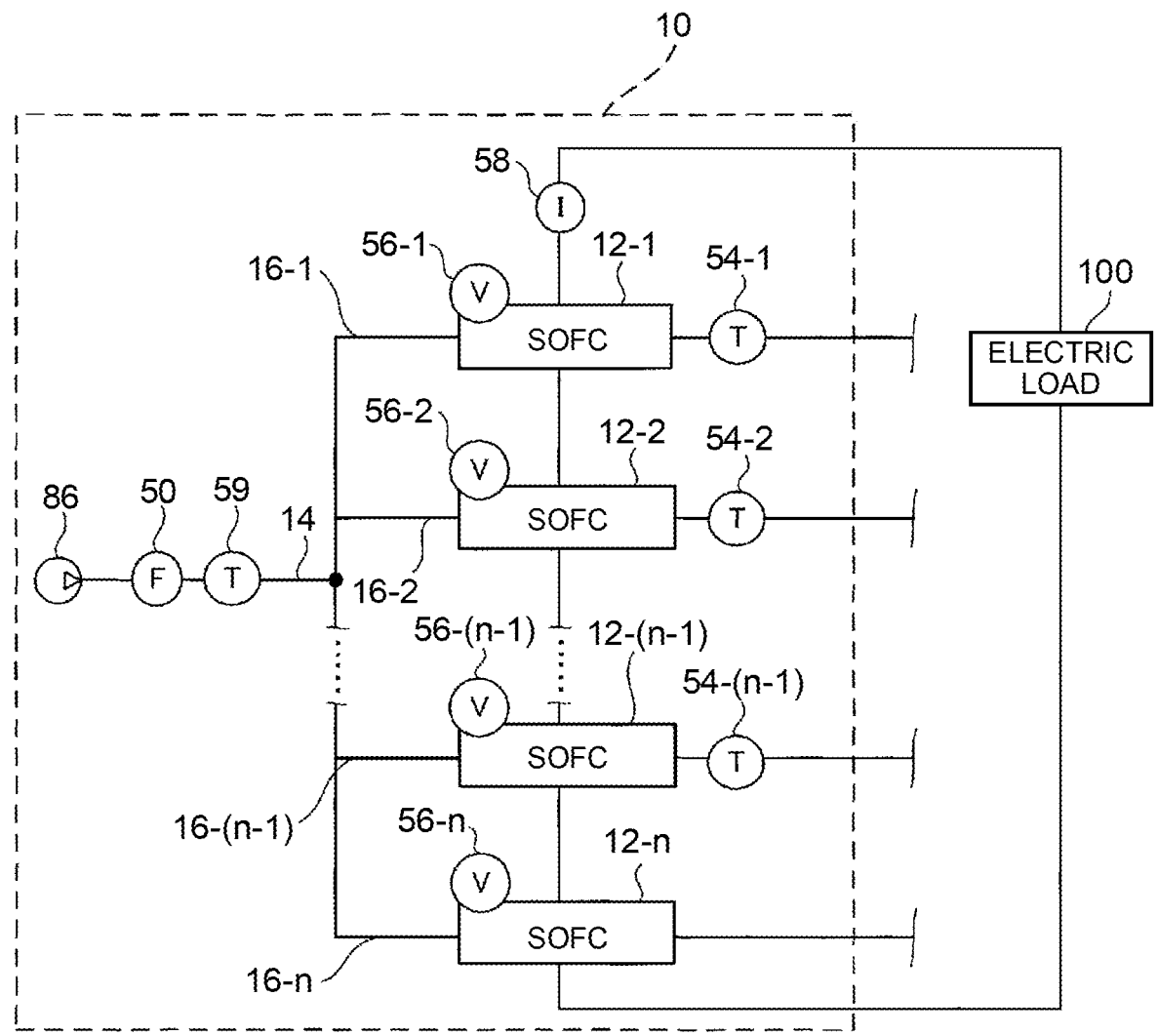
FIG. 13 is a diagram illustrating a configuration of a fuel cell system according to a fourth embodiment.
Figure 13:
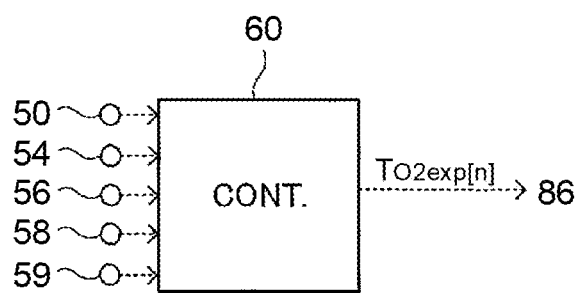

FIG. 13 is a diagram illustrating a configuration of the fuel cell system 10 according to the fourth embodiment.

As shown in the drawing, the fuel cell system 10 according to the present embodiment includes an air pump 86 as a refrigerant adjusting device that adjusts the flow rate of air in the air supply passage 14 in addition to the configuration of the fuel cell system 10 according to the second embodiment illustrated in FIG. 9.

In the fuel cell system 10 according to the present embodiment having the above-described configuration, the controller 60 controls the output of the air pump 86 on the basis of a first outlet temperature $T_{o1[k]}$ detected by the first outlet temperature sensor 54-$k$ and a second outlet temperature $T_{o2exp[n]}$ calculated through the processes (at Steps S510 to S530 in FIG. 10) described in the second embodiment, and adjusts the flow rate of air in the air supply passage 14.

It is to be noted that in the present embodiment, a flow rate control outlet temperature $T_{o\_f\_cont}$ is calculated by applying all values from 0 to n−1 to k. Therefore, the flow rate control outlet temperature $T_{o\_f\_cont}$ is set to the highest value in all the first outlet temperatures $T_{o1[1]}, T_{o1[2]}, \ldots,$ and $T_{o1[n-1]}$ and the second outlet temperature $T_{o2exp[n]}$.

Figure 14:
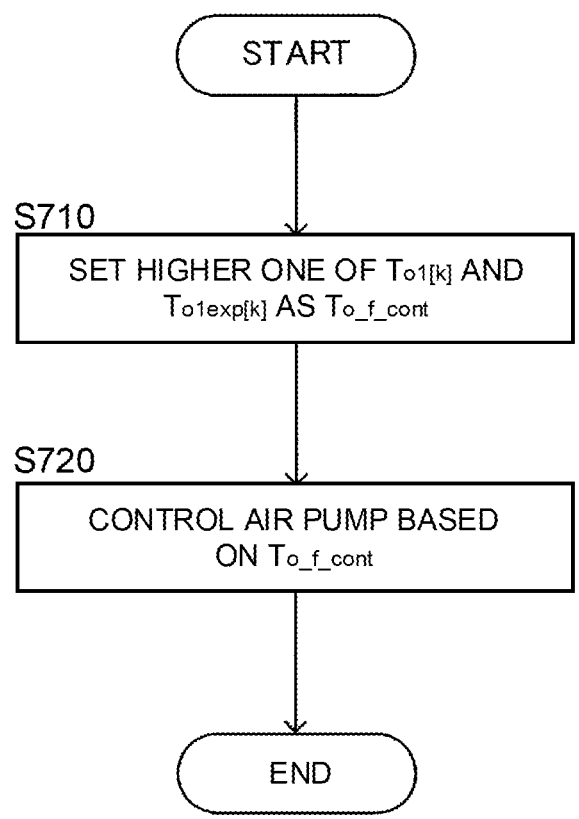
FIG. 14 is a flowchart illustrating the flow of air flow rate control in the fourth embodiment.

FIG. 14 is a flowchart illustrating the flow of air flow rate control in the present embodiment.

At Step S710, the controller 60 sets either the first outlet temperature $T_{o1[k]}$ or the second outlet temperature $T_{o2exp[n]}$, whichever is higher as a flow rate control outlet temperature $T_{o\_f\_cont}$ for controlling the flow rate of air in the air supply passage 14. That is, the flow rate control outlet temperature $T_{o\_f\_cont} = \text{Max}\{T_{o1[k]}, T_{o2exp[n]}\}$ is defined.

At Step S720, the controller 60 controls the output of the air pump 86 so as to bring the flow rate control outlet temperature $T_{o\_f\_cont}$ closer to a predetermined target temperature. Specifically, as the flow rate control outlet temperature $T_{o\_f\_cont}$ moves away from the target temperature in a direction of getting lower, the controller 60 makes the output of the air pump 86 lower. Furthermore, as the flow rate control outlet temperature $T_{o\_f\_cont}$ moves away from the target temperature in a direction of getting higher, the controller 60 makes the output of the air pump 86 higher.

The fuel cell system 10 according to the present embodiment described above achieves the following functions and effects.

The fuel cell system 10 according to the present embodiment further includes the air pump 86 as a refrigerant adjusting device that adjusts the flow rate of air in the air supply passage 14. Then, the controller 60 adjusts the flow rate of air in the air supply passage 14 by controlling the air pump 86 on the basis of the first outlet temperature $T_{o1[k]}$ and the second outlet temperature $T_{o2exp[n]}$ (Steps S710 and S720 in FIG. 14).

Accordingly, the flow rate of air in the air supply passage 14 is controlled on the basis of the detected first outlet temperature $T_{o1[k]}$ of the first SOFC stack 12-$k$ and the second outlet temperature $T_{o2exp[n]}$ of the second SOFC stack 12-$n$ estimated through the processes described in the above-described second embodiment, etc. That is, the flow rate of air in the air supply passage 14 is controlled on the basis of air outlet temperature information that takes into consideration the variation in the flow rate of supplied air among the first SOFC stacks 12-$k$ and the second SOFC stack 12-$n$, and therefore the flow rate of air to be supplied to each one (a target air flow rate) can be set more appropriately. As a result, it is possible to perform the temperature control of the first SOFC stacks 12-$k$ and the second SOFC stack 12-$n$ more suitably.

In the present embodiment, particularly, the controller 60 controls the air pump 86 on the basis of the flow rate control outlet temperature $T_{o\_f\_cont}$ that is either the first outlet temperature $T_{o1[k]}$ or the second outlet temperature $T_{o2exp[n]}$, whichever is higher (Step S720 in FIG. 14).

Therefore, the output of the air pump 86 is controlled on the basis of the highest air outlet temperature among the first SOFC stacks 12-$k$ (k=1 to n−1) and the second SOFC stack 12-$n$.

As a result, it is likely to be controlled to a direction of increasing the flow rate of air supplied to the first SOFC stacks 12-$k$ and the second SOFC stack 12-$n$, and therefore it is possible to further improve the safety in terms of the heat resistance of the first SOFC stacks 12-$k$ and the second SOFC stack 12-$n$.

Fifth Embodiment

A fifth embodiment is described below. It is to be noted that a component similar to that of any of the above-described embodiments and the modification examples is assigned the same reference numeral, and its description is omitted.

Figure 15:
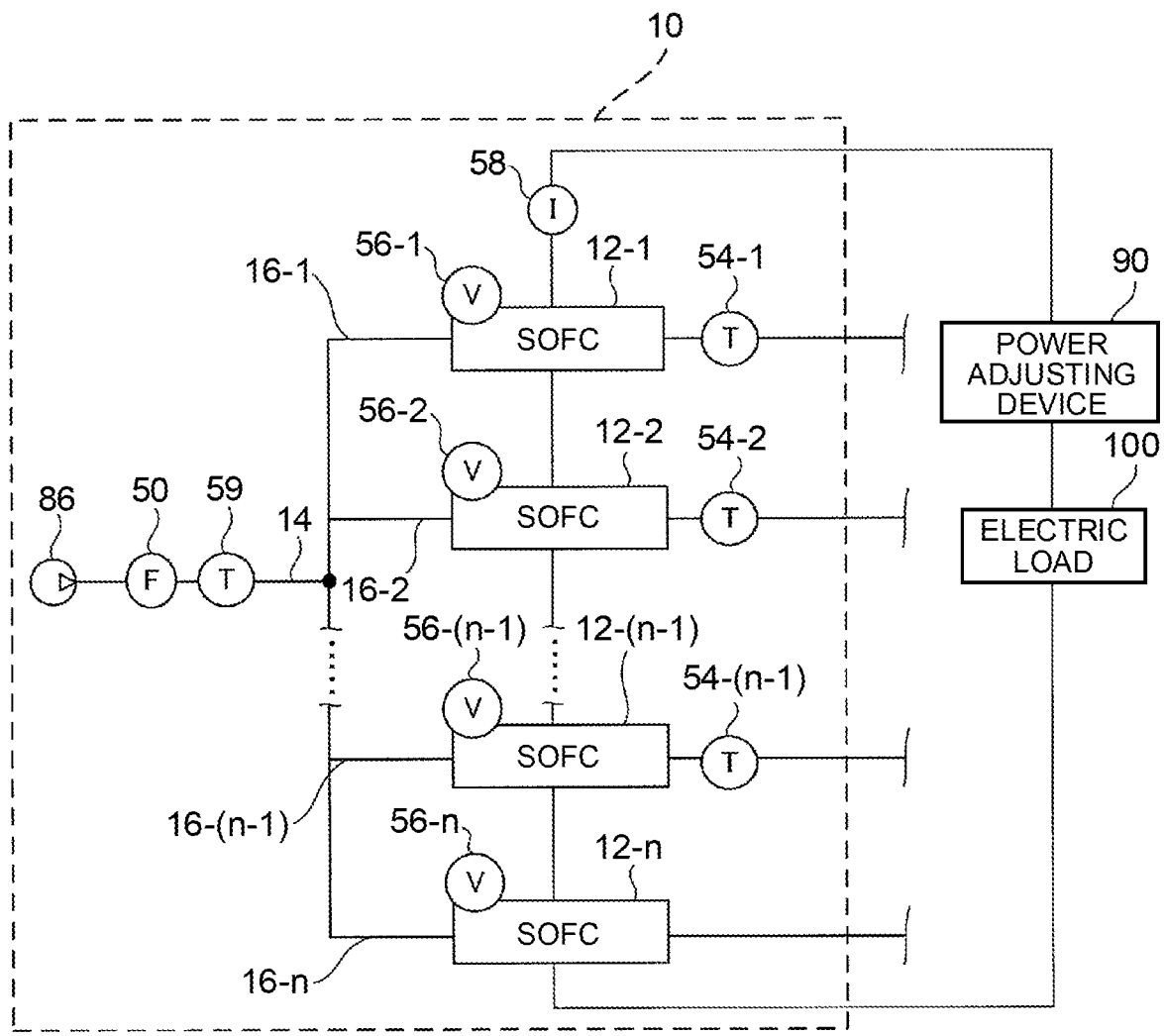
FIG. 15 is a diagram illustrating a configuration of a fuel cell system according to a fifth embodiment.
Figure 15:
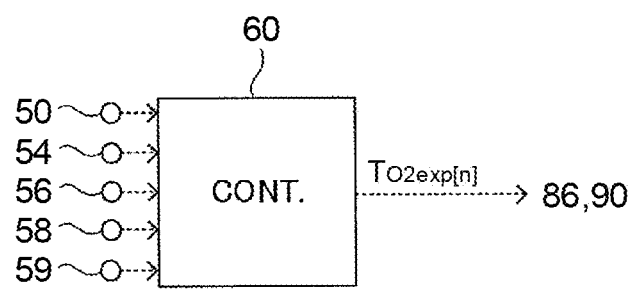

FIG. 15 is a diagram illustrating a configuration of the fuel cell system 10 according to the fifth embodiment.

As shown in the drawing, the fuel cell system 10 according to the present embodiment is based on the configuration of the fuel cell system 10 according to the fourth embodiment illustrated in FIG. 13. Then, the fuel cell system 10 according to the present embodiment further includes a power adjusting device 90 as a power adjusting device that adjusts generating power (an extraction current) of each of the SOFC stacks 12-1 to 12-$n$ in addition to the configuration of the fourth embodiment. It is to be noted that this power adjusting device 90 includes a DC/DC converter, etc.

Furthermore, the power adjusting device 90 is configured to be able to individually adjust the generating power of the first SOFC stacks 12-$k$ (1≤k≤n−1) and the second SOFC stack 12-$n$.

Therefore, in the present embodiment, the controller 60 can basically control the generating power of the first SOFC stack 12-$k$ (1≤k≤n−1) on the basis of the first outlet temperature $T_{o1[k]}$, and control the generating power of the second SOFC stack 12-$n$ on the basis of the second outlet temperature $T_{o2exp[n]}$.

However, in the present embodiment, to more certainly prevent the temperatures of the first SOFC stacks 12-$k$ and the second SOFC stack 12-$n$ from increasing above a predetermined temperature set in terms of heat resistance due to heat generated from the first SOFC stacks 12-$k$ and the second SOFC stack 12-$n$, the controller 60 performs generating power control based on a power control outlet temperature $T_{o\_g\_cont}$ that takes a safety margin into consideration. Its details are described below.

Figure 16:
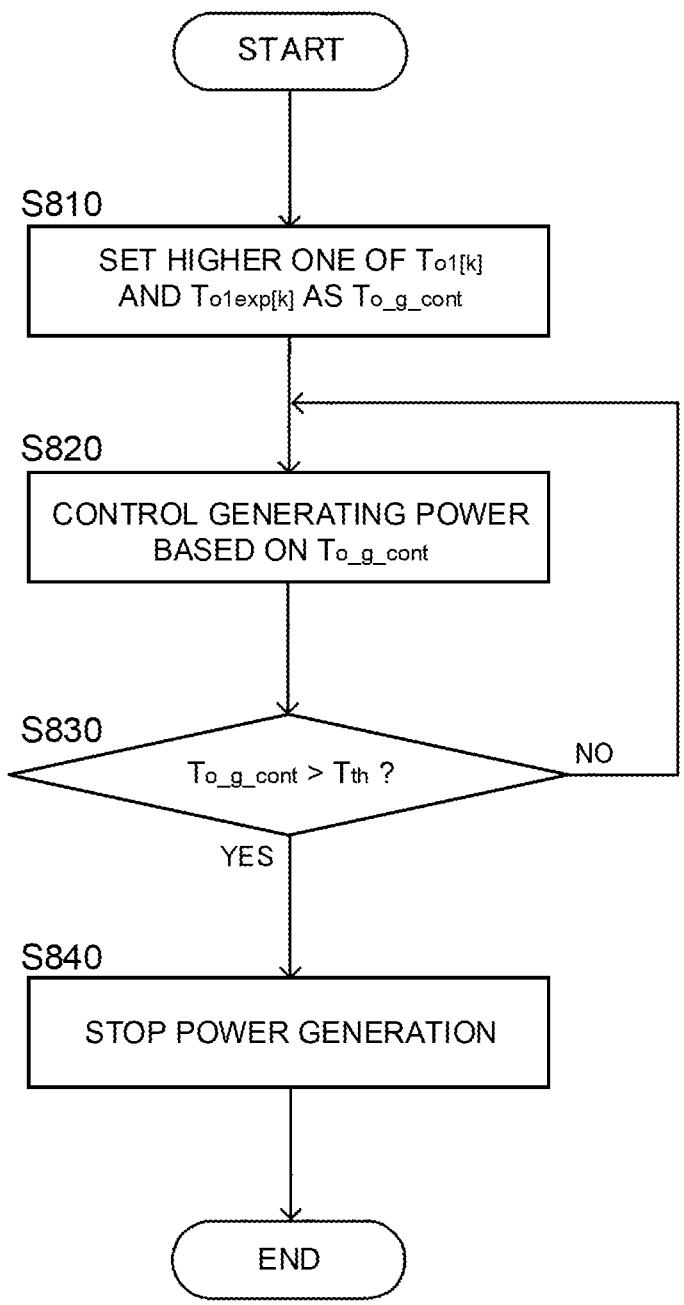
FIG. 16 is a flowchart illustrating the flow of generating power control in the fifth embodiment.

FIG. 16 is a flowchart illustrating the generating power control in the present embodiment.

At Step S810, the controller 60 sets either the first outlet temperature $T_{o1[k]}$ or the second outlet temperature $T_{o2exp[n]}$, whichever is higher as a power control outlet temperature $T_{o\_g\_cont}$ for controlling the generating power. That is, the power control outlet temperature $T_{o\_g\_cont} = \text{Max}\{T_{o1[k]}, T_{o2exp[n]}\}$ is defined.

It is to be noted that in the present embodiment, the power control outlet temperature $T_{o\_g\_cont}$ is calculated by applying all values from 0 to n−1 to k. Therefore, the power control outlet temperature $T_{o\_g\_cont}$ is set to the highest value in all the first outlet temperatures $T_{o1[1]}$, $T_{o1[2]}$, ..., and $T_{o1[n-1]}$ and the second outlet temperature $T_{o2exp[n]}$.

At Step S820, the controller 60 controls the power adjusting device 90 so as to bring the power control outlet temperature $T_{o\_g\_cont}$ closer to a predetermined target temperature. Specifically, as the power control outlet temperature $T_{o\_g\_cont}$ moves away from the target temperature in a direction of getting lower, the controller 60 controls the power adjusting device 90 to make the electric power (the calorific value) extracted from each SOFC stack 12 lower. Furthermore, as the further the power control outlet temperature $T_{o\_g\_cont}$ moves away from the target temperature in a direction of getting higher, the controller 60 controls the power adjusting device 90 to make the electric power (the calorific value) extracted from each SOFC stack 12 higher.

At Step S830, the controller 60 determines whether or not the power control outlet temperature $T_{o\_g\_cont}$ is higher than a predetermined threshold temperature $T_{th}$ in a state where the power adjusting device 90 is controlled at Step S820. The threshold temperature $T_{th}$ here is a value determined in an experiment or the like in terms of preventing the temperatures of the first SOFC stacks 12-k and the second SOFC stack 12-n from getting too high in consideration of the heat resistance, etc. according to the specifications of the first SOFC stacks 12-k and the second SOFC stack 12-n.

When having determined that the power control outlet temperature $T_{o\_g\_cont}$ is not higher than the threshold temperature $T_{th}$, the controller 60 continues the generating power control at Step S820. On the other hand, when having determined that the power control outlet temperature $T_{o\_g\_cont}$ is higher than the threshold temperature $T_{th}$, the controller 60 performs a process at Step S840.

At Step S840, the controller 60 controls the power adjusting device 90 to cause the power generation of the first SOFC stacks 12-k and the second SOFC stack 12-n to be stopped. That is, if the power control outlet temperature $T_{o\_g\_cont}$ becomes higher than a certain level, the controller 60 causes the power adjusting device 90 to stop the power generation of the first SOFC stacks 12-k and the second SOFC stack 12-n in terms of heat-resistance protection, etc.

The fuel cell system 10 according to the present embodiment described above achieves the following functions and effects.

The fuel cell system 10 according to the present embodiment further includes the power adjusting device 90 that adjusts the generating power of the SOFC stacks 12. Then, the controller 60 controls the power adjusting device 90 on the basis of the first outlet temperature $T_{o1[k]}$ and the second outlet temperature $T_{o2exp[n]}$ (Steps S810 to S840 in FIG. 16).

Accordingly, the generating power of the SOFC stacks 12 is controlled on the basis of the detected first outlet temperature $T_{o1[k]}$ of the first SOFC stack 12-k and the second outlet temperature $T_{o2exp[n]}$ of the second SOFC stack 12-n estimated through the processes described in the above-described second embodiment, etc. That is, the generating power of the SOFC stacks 12 is controlled on the basis of the air outlet temperature information that takes into consideration the variation in the flow rate of supplied air among the first SOFC stacks 12-k and the second SOFC stack 12-n, and therefore it is possible to perform control of the respective calorific values of the first SOFC stacks 12-k and the second SOFC stack 12-n based on the adjustment of the generating power with higher accuracy.

In the present embodiment, particularly, the controller 60 controls the power adjusting device 90 on the basis of the power control outlet temperature $T_{o\_g\_cont}$ that is either the first outlet temperature $T_{o1[k]}$ or the second outlet temperature $T_{o2exp[n]}$, whichever is higher (Step S810 in FIG. 16).

That is, the power control outlet temperature $T_{o\_g\_cont}$ is set to be either the first outlet temperature $T_{o1[k]}$ or the second outlet temperature $T_{o2exp[n]}$, whichever is higher. Therefore, respective amounts of power generation by the first SOFC stacks 12-k and the second SOFC stack 12-n are controlled on the basis of an air output temperature of, of the first SOFC stacks 12-k (k=1 to n−1) and the second SOFC stack 12-n, the one estimated to have the highest calorific value.

As a result, the generating power of the first SOFC stacks 12-k and the second SOFC stack 12-n is likely to be controlled to a direction of further decreasing the calorific value, and therefore it is possible to further improve the safety in terms of the heat resistance of the first SOFC stacks 12-k and the second SOFC stack 12-n.

Furthermore, in the present embodiment, if the power control outlet temperature $T_{o\_g\_cont}$ exceeds the predetermined threshold temperature $T_{th}$, the controller 60 causes the power adjusting device 90 to stop the power generation of the first SOFC stacks 12-k and the second SOFC stack 12-n (Steps S830 and S840 in FIG. 16).

That is, if the power control outlet temperature $T_{o\_g\_cont}$ set to the safety side in terms of heat-resistance protection exceeds the threshold temperature $T_{th}$, the power generation is stopped to stop the heat generation of the first SOFC stacks 12-k and the second SOFC stack 12-n.

Accordingly, it is possible to certainly prevent the first SOFC stacks 12-k and the second SOFC stack 12-n from having a temperature exceeding an upper temperature limit or the like determined in terms of heat-resistance protection, and therefore the safety is further improved in terms of the heat resistance of the first SOFC stacks 12-k and the second SOFC stack 12-n.

The embodiments of the present invention are described above; however, the above-described embodiments are merely some of application examples of the present invention, and are not meant to limit the technical scope of the present invention to the specific configurations of the above-described embodiments.

For example, in the fuel cell system 10 according to any of the above-described embodiments and the modification examples, a pre-distribution air flow rate $q_{air}$ that is the sum of respective flow rates of air supplied to the SOFC stacks 12-1 and 12-n is detected by the pre-distribution air flow rate sensor 50. However, instead of providing the pre-distribution air flow rate sensor 50, the pre-distribution air flow rate $q_{air}$ may be estimated from, for example, a set output of the air pump 86 used to supply air into the air supply passage 14.

Furthermore, in the fuel cell system 10 according to any of the above-described embodiments and the modification examples, the SOFC stacks 12-1 and 12-n are arranged in parallel with the electric load, and this one current sensor 58 is provided and shared by them. However, in a case where the SOFC stacks have different currents, such as in the case where the SOFC stacks are not arranged in parallel with the electric load, all the SOFC stacks may be provided with a current sensor, or at least SOFC stacks having different currents from each other may be provided with a current sensor.

Moreover, in the fuel cell system 10 according to any of the above-described embodiments and the modification examples, for example, in calculation of a first calorific value $Q_{gen1[k]}$ or a second calorific value $Q_{gen2[n]}$, the same theoretical electromotive force E0 is set in all the SOFC stacks 12-1 to 12-$n$. However, for example, in a case where an output enable voltage per stack is different among the SOFC stacks 12-1 to 12-$n$, such as in the case where the number of stacks of unit cells is different among the SOFC stacks 12-1 to 12-$n$, a calorific value may be calculated with a different value of theoretical electromotive force fittingly set for each of the SOFC stacks 12-1 to 12-$n$.

Furthermore, in the fuel cell system 10 according to any of the above-described embodiments and the modification examples, there is described an example where the fuel cell group 12 is composed of the SOFC stacks 12-1 to 12-$n$. However, the calculation method, the supply air flow rate control, and the generating power control according to any of the above-described embodiments and the modification examples can also be applied to a system in which at least part of the fuel cell group 12 is composed of unit fuel cells.

Moreover, the "air specific heat $c_{air}$" used in calculation in the above-described embodiments and the modification examples and the "fuel specific heat $c_{fuel}$" used in calculation in the third embodiment both take a fixed value; however, for example, a corrected value may be used fittingly in consideration of variation in their value caused by factors, such as temperature.

The invention claimed is:

1. A fuel cell system comprising:
   a fuel cell group including n units of fuel cell stacks electrically connected in series; and
   refrigerant distribution passages through which a refrigerant is individually distributed to the n units of the fuel cell stacks;
   a refrigerant adjusting device configured to adjust refrigerant flow rate;
   a flow rate sensor configured to detect a pre-distribution refrigerant flow rate that is a flow rate of the refrigerant before distribution;
   a first outlet temperature sensor provided at a refrigerant outlet of each of n−1 units of the fuel cell stacks to detect a first outlet temperature that is a refrigerant outlet temperature of the each of the n−1 units of the fuel cell stacks;
   a first voltage sensor configured to detect a first voltage $V_{1[k]}$ that is a voltage of the each of the n−1 units of the fuel cell stacks;
   a current sensor configured to detect a current I that flows through the n units of the fuel cell stacks;
   a pre-distribution refrigerant temperature sensor configured to detect a pre-distribution refrigerant temperature $T_{in}$;
   a second voltage sensor configured to detect a second voltage $V_{2[n]}$ that is a voltage of the fuel cell stack other than the n−1 units of the fuel cell stacks;
   a fuel flow rate sensor configured to detect a flow rate of fuel $q_{fuel}$ supplied to the n units of the fuel cell stacks, and
   a controller programmed to:
     calculate a first calorific value $Q_{gen1[k]}$ of each of the n−1 units of the fuel cell stacks on a basis of the first voltage $V_{1[k]}$ and the current I using Equation (A);

$$Q_{gen1[k]} = I(E_0 - V_{1[k]}) \tag{A}$$

where, k=an integer from unity to n−1, and
     $E_0$=theoretical electromotive force of the each of the n−1 units of the fuel cell stacks,
   calculate an assumed first outlet temperature value $T_{O1exp[k]}$, which is the first outlet temperature expected to be detected if a uniform flow rate of the refrigerant is distributed to each of the n−1 units of the fuel cell stacks using Equation (B):

$$T_{O1exp[k]} = T_{in} + \frac{Q_{gen1[k]}}{\frac{q_{air}}{n} c_{air}} \tag{B}$$

where, $c_{air}$=specific heat capacity of air,
     $T_{in}$=the pre-supply refrigerant temperature, which is a temperature of the refrigerant before the distribution,
     $q_{air}$=the pre-distribution refrigerant flow rate, and
     $Q_{gen1[k]}$=the first calorific value,
   set Equation (C) which represents a relation between the pre-supply refrigerant temperature $T_{in}$, the first calorific value $Q_{gen1[k]}$, a first individual supply flow rate $q_{air1\_d[k]}$, which is a flow rate of the refrigerant supplied to the each of the n−1 units of the fuel cell stacks, the specific heat capacity $c_{air}$ of air, and the first outlet temperature $T_{O1[k]}$, $$T_{O1exp[k]} = T_{in} + Q_{gen1[k]} / q_{air1\_d[k]} \cdot c_{air} \tag{C}$$

calculate the first individual supply flow rate $q_{air1\_d[k]}$ using Equation (D) obtained from Equation (B) and Equation (C);

$$q_{air1\_d[k]} = \frac{\frac{q_{air}}{n} \cdot Q_{gen1[k]}}{Q_{gen1[k]} + \frac{q_{air}}{n} \cdot c_{air}(T_{O1[k]} - T_{O1exp[k]})} \tag{D}$$

calculate a second individual supply flow rate $q_{air2\_d(n)}$, which is a flow rate of the refrigerant supplied to a fuel cell stack other than the n−1 units of the fuel cell stacks, using Equation (E):

$$q_{air2\_d[n]} = q_{air} - (q_{air1\_d[1]} + q_{air1\_d[2]} + \ldots + q_{air1\_d[n-1]}) \tag{E}$$

calculate a second outlet temperature $T_{O2exp[n]}$ that is a refrigerant outlet temperature of the fuel cell stack other than the n−1 units of the fuel cell stacks on a basis of the second voltage $V_{2[n]}$, the current I, the pre-distribution refrigerant temperature $T_{in}$, and the second individual supply flow rate $q_{air2\_d[n]}$, using Equations (F) and (G):

$$Q_{gen2[k]} = I(E_0 - V_{2[n]}) \tag{F}$$

where, $Q_{gen2[k]}$=second calorific value of the fuel cell stack other than the n−1 units of the fuel cell stacks, $$T_{O2exp[k]} = T_{in} + \frac{Q_{gen2[n]}}{q_{air2\_d[n]} \cdot c_{air}} \tag{G}$$

set either the first outlet temperature $T_{O1[k]}$ or the second outlet temperature $T_{O1exp[n]}$, whichever is higher, as a flow rate control outlet temperature $T_{O\_f\_cont}$, and
   control the refrigerant adjusting device such that the flow rate control outlet temperature $T_{O\_f\_cont}$ approaches a predetermined target temperature by causing the refrigerant adjusting device to decrease the pre-distribution refrigerant flow rate when the flow rate control outlet temperature $T_{O\_f\_cont}$ is lower than the target temperature and causing the refrigerant adjusting device to increase the pre-distribution refrigerant flow rate when the flow rate control outlet temperature $T_{O\_f\_cont}$ is higher than the target temperature.

2. A fuel cell system comprising:
a fuel cell group including n units of fuel cell stacks electrically connected in series; and
refrigerant distribution passages through which a refrigerant is individually distributed to the n units of the fuel cell stacks;
a flow rate sensor configured to detect a pre-distribution refrigerant flow rate that is a flow rate of the refrigerant before distribution;
a first outlet temperature sensor provided at a refrigerant outlet of each of n−1 units of the fuel cell stacks to detect a first outlet temperature that is a refrigerant outlet temperature of the each of the n−1 units of the fuel cell stacks;
a first voltage sensor configured to detect a first voltage $V_{1[k]}$ that is a voltage of the each of the n−1 units of the fuel cell stacks;
a current sensor configured to detect a current I that flows through the n units of the fuel cell stacks;
a power adjusting device configured to adjust generating power of the n units of fuel cell stacks,
a pre-distribution refrigerant temperature sensor configured to detect a pre-distribution refrigerant temperature $T_{in}$;
a second voltage sensor configured to detect a second voltage $V_{2[n]}$ that is a voltage of the fuel cell stack other than the n−1 units of the fuel cell stacks;
a fuel flow rate sensor configured to detect a flow rate of fuel $q_{fuel}$ supplied to the n units of the fuel cell stacks, and
a controller programmed to:
calculate a first calorific value $Q_{gen1[k]}$ of each of the n−1 units of the fuel cell stacks on a basis of the first voltage $V_{1[k]}$ and the current/using Equation (A);

$$Q_{gen1[k]} = I(E_0 - V_{1[k]}) \tag{A}$$

where, k=an integer from unity to n−1, and
$E_0$=theoretical electromotive force of the each of the n−1 units of the fuel cell stacks,
calculate an assumed first outlet temperature value $T_{O1exp[k]}$, which is the first outlet temperature expected to be detected if a uniform flow rate of the refrigerant is distributed to each of the n−1 units of the fuel cell stacks using Equation (B):

$$T_{O1exp[k]} = T_{in} + \frac{Q_{gen1[k]}}{\frac{q_{air}}{n} \cdot c_{air}} \tag{B}$$

where, $c_{air}$=specific heat capacity of air,
$T_{in}$=the pre-supply refrigerant temperature, which is a temperature of the refrigerant before the distribution,
$q_{air}$=the pre-distribution refrigerant flow rate, and
$Q_{gen1[k]}$=the first calorific value,
set Equation (C) which represents a relation between the pre-supply refrigerant temperature $T_{in}$, the first calorific value $Q_{gen1[k]}$, a first individual supply flow rate $q_{air1\_d[k]}$, which is a flow rate of the refrigerant supplied to the each of the n−1 units of the fuel cell stacks, the specific heat capacity $c_{air}$ of air, and the first outlet temperature $T_{O1[k]}$, $$T_{O1exp[k]} = T_{in} + \frac{Q_{gen1[k]}}{q_{air1\_d[k]} \cdot c_{air}} \tag{C}$$

calculate the first individual supply flow rate $q_{air1\_d[k]}$ using Equation (D) obtained from Equation (B) and Equation (C);

$$q_{air1\_d[k]} = \frac{\frac{q_{air}}{n} \cdot Q_{gen1[k]}}{Q_{gen1[k]} + \frac{q_{air}}{n} \cdot c_{air}(T_{O1[k]} - T_{O1exp[k]})} \tag{D}$$

calculate a second individual supply flow rate $q_{air2\_d(n)}$, which is a flow rate of the refrigerant supplied to a fuel cell stack other than the n−1 units of the fuel cell stacks, using Equation (E):

$$q_{air2\_d[n]} = q_{air} - (q_{air1\_d[1]} + q_{air1\_d[2]} + \cdots + q_{air1\_d[n-1]}) \tag{E}$$

calculate a second outlet temperature $T_{O2exp[n]}$ that is a refrigerant outlet temperature of the fuel cell stack other than the n−1 units of the fuel cell stacks on a basis of the second voltage $V_{2[n]}$, the current I, the pre-distribution refrigerant temperature $T_{in}$, and the second individual supply flow rate $q_{air2\_d[n]}$, using Equations (F) and (G):

$$Q_{gen2[k]} = I(E_0 - V_{2[n]}) \tag{F}$$

where, $Q_{gen2[k]}$=second calorific value of the fuel cell stack other than the n−1 units of the fuel cell stacks, $$T_{O2exp[k]} = T_{in} + \frac{Q_{gen2[n]}}{q_{air2\_d[n]} \cdot c_{air}} \tag{G}$$

set either the first outlet temperature $T_{O1[k]}$ or the second outlet temperature $T_{O1exp[n]}$, whichever is higher, as a power control outlet temperature $T_{O\_f\_cont}$, and
control the power adjusting device such that the power control outlet temperature $T_{O\_q\_cont}$ approaches a predetermined target temperature by causing the power adjusting device to decrease the generating power when the power control outlet temperature $T_{O\_q\_cont}$ is lower than the target temperature and causing the power adjusting device to increase the generating power when the power control outlet temperature $T_{O\_q\_cont}$ is higher than the target temperature.

3. The fuel cell system according to claim 2, wherein the controller is further programmed to cause the power adjusting device to stop power generation when the power control outlet temperature $T_{O\_q\_cont}$ exceeds a threshold temperature.

* * * * *